United States Patent [19]
Ohno et al.

[11] Patent Number: 5,150,351
[45] Date of Patent: Sep. 22, 1992

[54] OPTICAL INFORMATION RECORDING APPARATUS FOR RECORDING AN INPUT SIGNAL HAVING VARIABLE WIDTH PULSE DURATION AND PULSE SPACING PERIODS

[75] Inventors: Eiji Ohno, Hirakata; Kenichi Nishiuchi, Moriguchi; Noboru Yamada, Hirakata; Kenzou Ishibashi, Moriguchi; Kunio Kimura, Tsuzuki; Nobuo Akahira, Yawata, all of Japan

[73] Assignee: Matsushita Electric Industrial Co., Ltd., Osaka, Japan

[21] Appl. No.: 712,031

[22] Filed: Jun. 7, 1991

Related U.S. Application Data

[62] Division of Ser. No. 546,906, Jul. 2, 1990, Pat. No. 5,109,373.

[30] Foreign Application Priority Data

Jun. 30, 1989 [JP] Japan .................... 1-170207
Dec. 13, 1989 [JP] Japan .................... 1-323369

[51] Int. Cl.⁵ .............................................. G11B 7/00
[52] U.S. Cl. .................................................. 369/116
[58] Field of Search ............... 369/32, 116, 111, 100, 369/59, 124; 360/40; 364/1.1, 76 L, 108

[56] References Cited

U.S. PATENT DOCUMENTS 5,001,692  3/1991  Farla et al. ................ 369/48
5,003,527  3/1991  Matsumoto et al. .......... 369/109

FOREIGN PATENT DOCUMENTS

0314390A1  7/1986  European Pat. Off. .
0317193A2  3/1988  European Pat. Off. .
63-266632  11/1988  Japan .
63-266633  11/1988  Japan .
63-279431  11/1988  Japan .

*Primary Examiner*—Roy N. Envall, Jr.
*Assistant Examiner*—Thai Tran
*Attorney, Agent, or Firm*—Wenderoth, Lind & Ponack

[57] ABSTRACT

A recording apparatus overwrites an input signal having pulse duration periods and pulse spacing periods to an optical disk by irradiation of a laser beam to form recording marks corresponding to the pulse duration periods. The apparatus includes a detector for detecting a leading edge of the pulse duration period and for producing a start signal thereupon, another detector for detecting a trailing edge of the pulse duration period and for producing a stop signal thereupon, a pattern setting circuit for setting a predetermined basic pattern, and a pattern generator for generating the basic pattern from its beginning in response to the start signal and for terminating the generation of the basic pattern in response to the stop signal. The apparatus further includes a circuit for forming a modulated signal using a full or portion of the basic pattern produced from the pattern generator. The laser output is produced in accordance with the modulated signal.

8 Claims, 20 Drawing Sheets

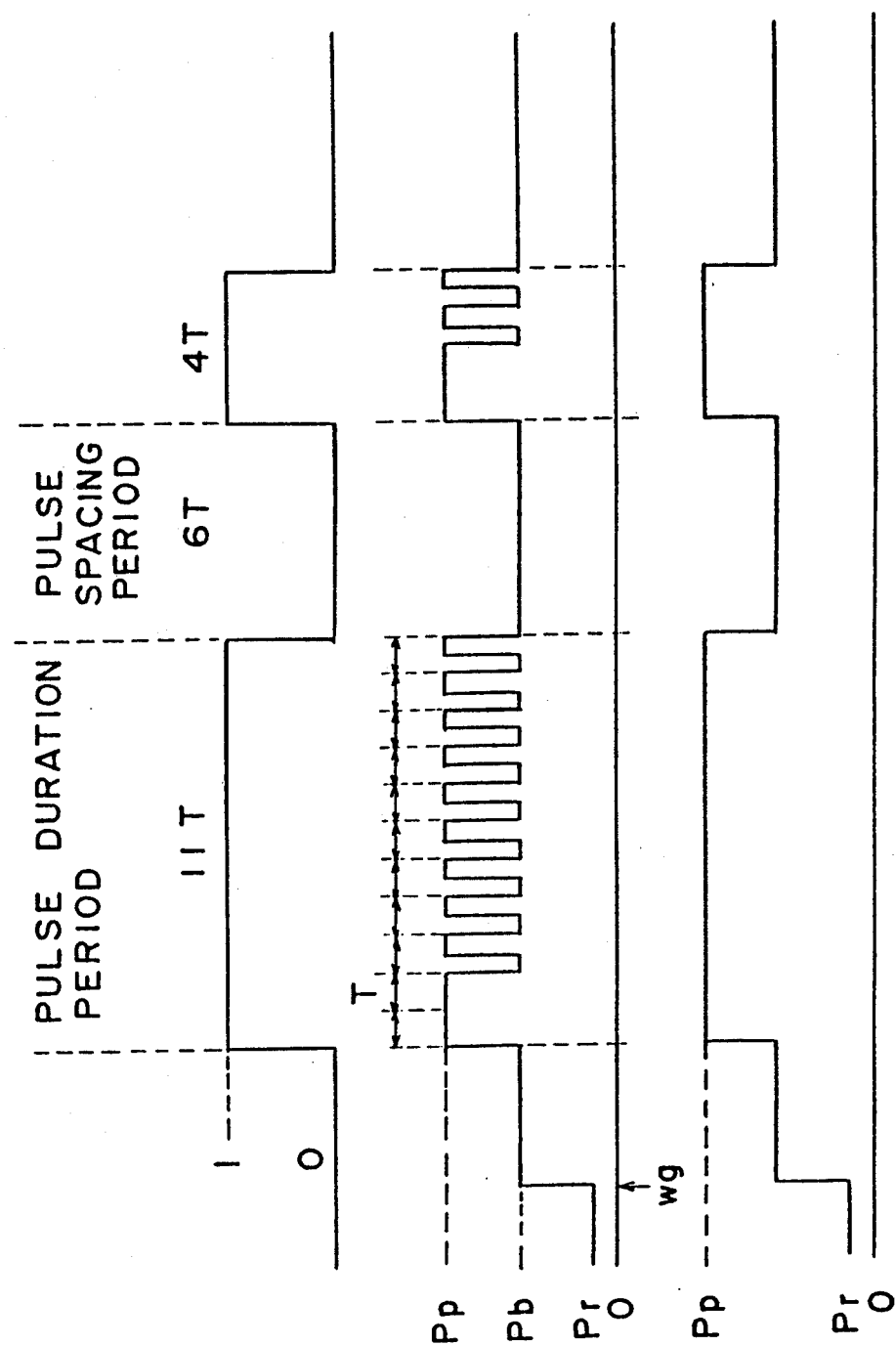

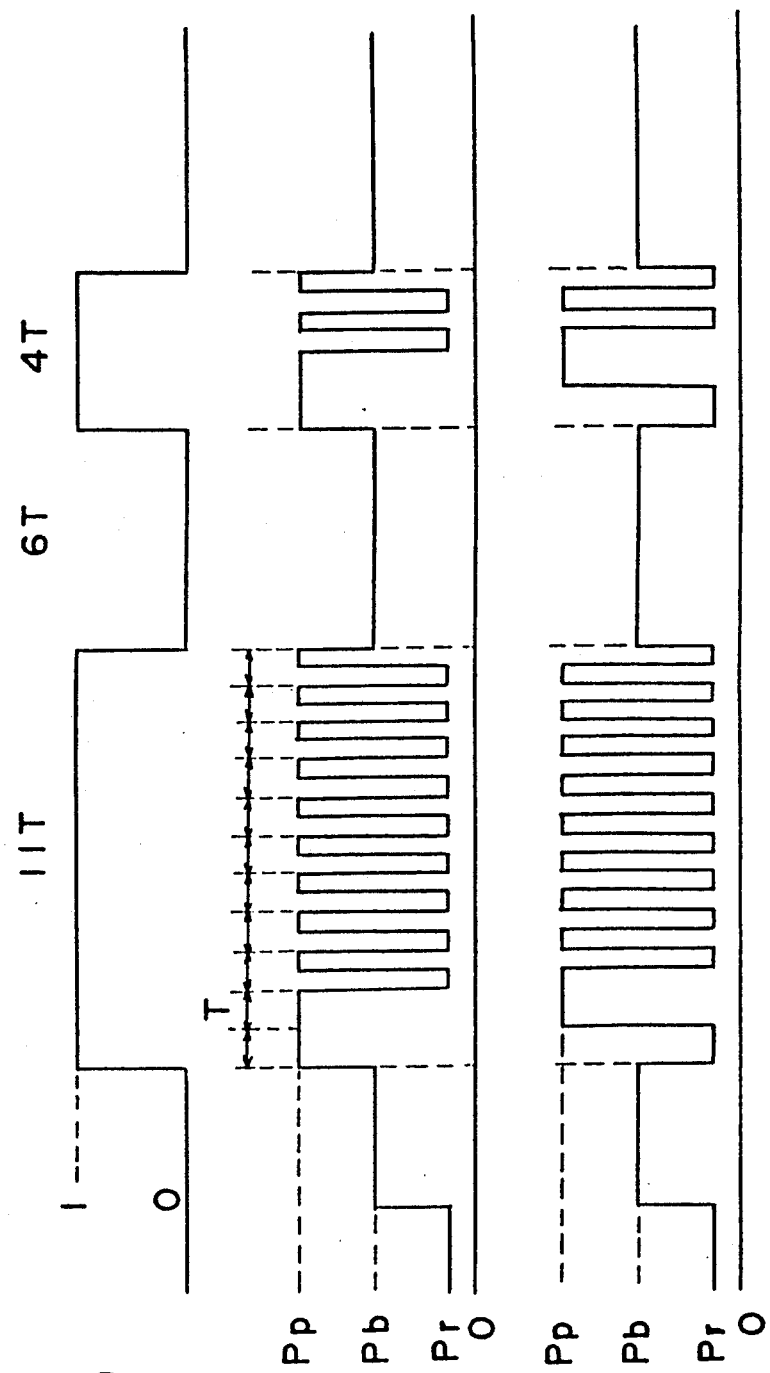

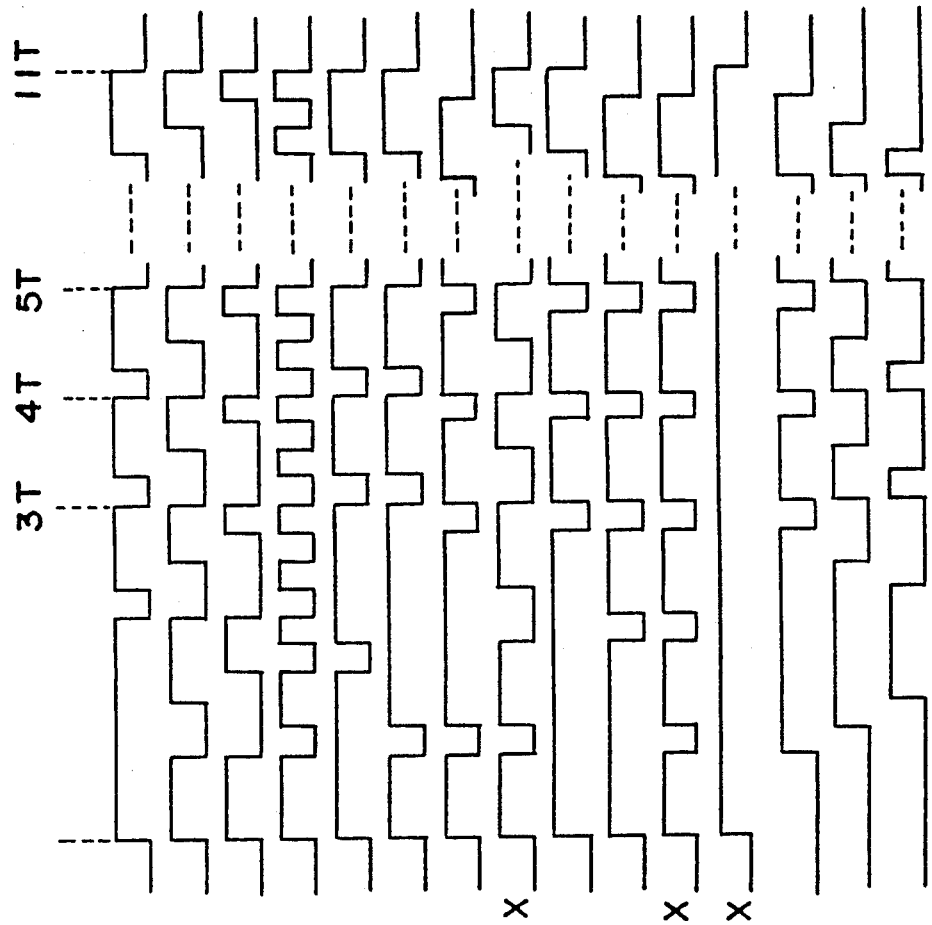

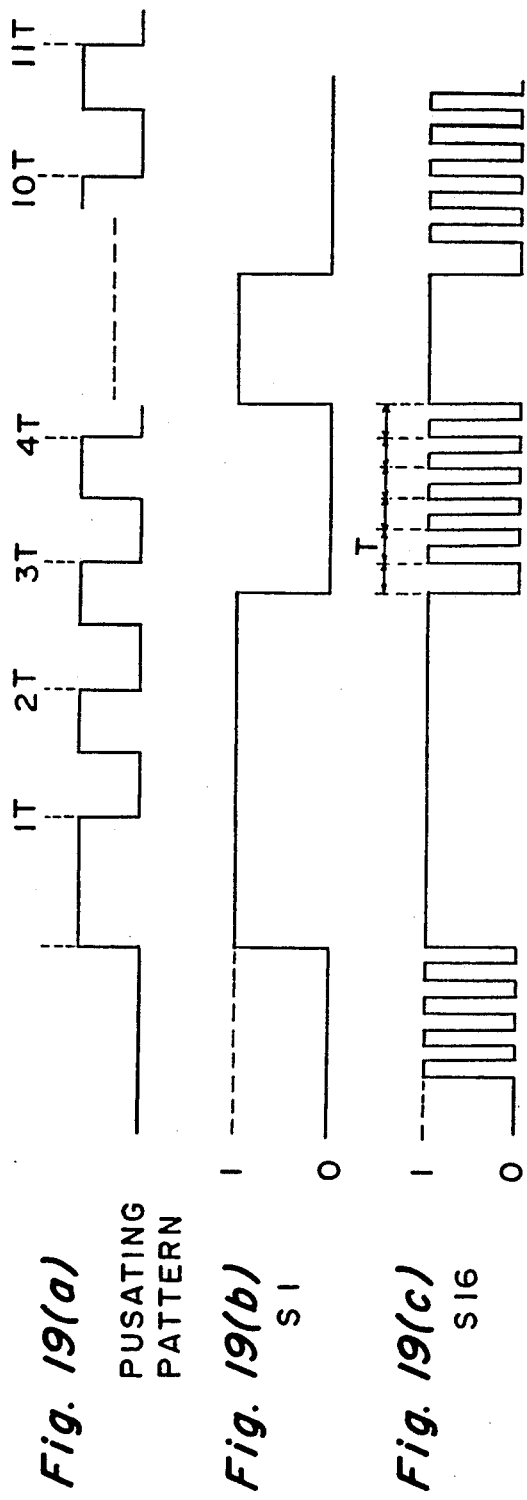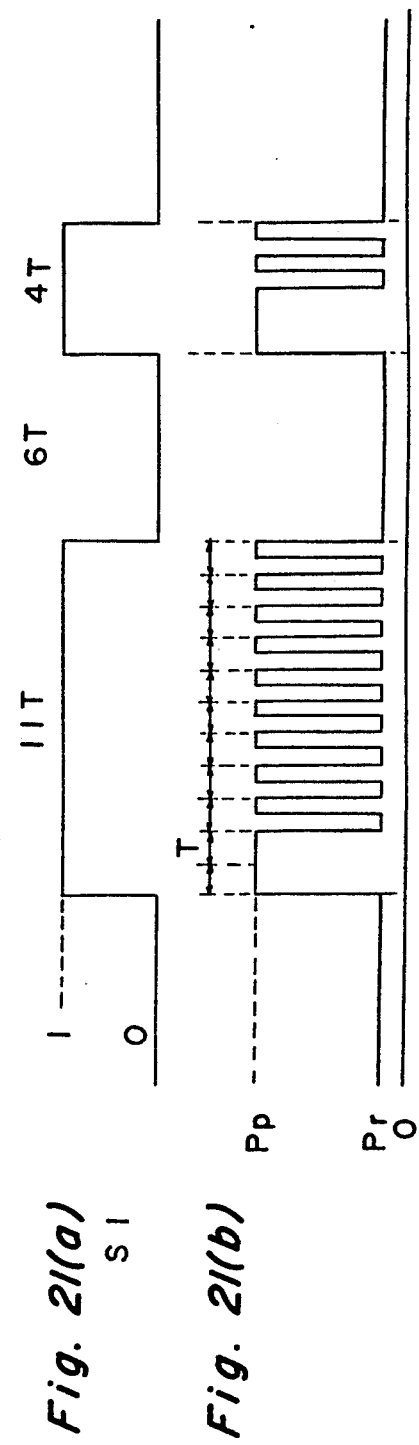

OPTICAL INFORMATION RECORDING APPARATUS FOR RECORDING AN INPUT SIGNAL HAVING VARIABLE WIDTH PULSE DURATION AND PULSE SPACING PERIODS

This application is a divisional of application Ser. No. 07/546,906, filed Jul. 2, 1990 now U.S. Pat. No. 5,109,373.

BACKGROUND OF THE INVENTION

1. Field of the Invention

The present invention relates to a recording apparatus for recording a signal on an optical information recording medium, primarily an optical disk to and from which optical information can be recorded and read at high speed and high density using a leaser beam or other optical source.

2. Description of the Prior Art

Technologies which apply laser beams to read and/or write high density information are commonly known, and are primarily used with optical disks. Optical disks can be classified into three broad categories: read-only, write-once read-many, and rewritable. Read-only disks include compact disks (CD), mainly used for recording musical information, and laser video disks (LVD), mainly used for recording image information. With these media, the signal is pre-recorded to the optical disk, and the user can playback the music or video information but is unable to record any additional signals. Recent research has therefore concentrated on the development of a rewritable type of media and drive which enables free and repeated writing and erasure of the signal.

Rewritable types use a recording thin film in which a reversible change between two states is induced by changing the emission conditions of the laser beam or other light source; the principal types of thin films used are magneto-optical and phase change media. Magneto-optical types use a ferromagnetic thin film as the recording thin film, and a signal is recorded by changing the orientation of the magnetic domain. Phase change types principally use a tellurium or selenium alloy as the recording thin film, and record a signal by changing the state of the thin film between amorphous and crystalline or between two types of crystal structures.

One of the merits of magneto-optical phase change media is that so-called single beam overwriting, wherein a single laser spot erases the old signal as it records the new signal, can be achieved with relative ease (Proceedings of SPIE Vol. 695, pp. 105–109). As shown in FIGS. 22 and 23(a), a new signal can be recorded while erasing the old signal by changing the laser power between two power levels, a recording level and an erase level.

However, according to the prior art recording system, the distortion of the recording mark into a teardrop-shaped mark which results in increased jitter and error rate also occurs, as explained below. When a signal as shown in FIG. 23(a) is used for recording, the achieved temperature of the recording film is relatively low at the front and gradually increases toward the back as shown in FIG. 23(b), due to the effects of preheating. This results in a teardrop-shaped recording mark as shown in FIG. 23(c). The distortion of the recording mark leads to distortion of the playback signal waveform, and is a cause of increased jitter. A number of improved recording systems are proposed for resolving this problem, and are described, for example, in Japanese patent publication (unexamined) Nos. S63-266632 and S63-279431, and in also in U.S. patent application Ser. No. 07/311,362 (corresponding to EP application 89301389.6) which is assigned to the same assignee as the present application.

The proposed systems for reducing recording mark shape distortion, such as disclosed in Japanese patent publication (unexamined) Nos. S63-266632 and S63-279431 are accomplished by composing the recording waveform used to form one recording mark from a pulse string comprising a short pulse of the same shape. In U.S. patent application Ser. No. 07/311,362 (corresponding to EP application 89301389.6), a recording waveform forming a recording mark is converted to a pulse string comprising multiple pulses wherein the interval between pulses is gradually decreased (or the pulse width is gradually increased), or both the recording waveform and the erase beam are modulated by a pulse string, to control the achieved temperature of the recording film and thus reduce the distortion of the recording mark.

Each of the above systems for reducing the distortion of the recording mark in a single beam overwrite system presents specific problems. Those described in Japanese Patent publication (unexamined) Nos. S63-266632 and S63-279431 are achieved with a simple construction, but are nominally effective in improving the recording mark shape. The invention described in U.S. patent application Ser. No. 07/311,362 (corresponding to EP application 89301389.6) can achieve a large distortion reduction effect, but because it requires pulse strings optimized for pulses of all possible pulse widths in the input signal to be preset, the result is a device of extremely complex construction. In other words, a recording method and recording apparatus using single beam overwriting to form a recording mark with low shape distortion by means of a device of extremely simple construction has not heretofore existed.

SUMMARY OF THE INVENTION

The object of the present invention is therefore to provide a recording apparatus which is able to significantly reduce recording mark distortion and thereby reduce jitter in the playback signal to a low level by recording a new signal while erasing an old signal in a data overwrite operation by means of a device of extremely simple construction.

In order to achieve the aforementioned objective, according to the present invention, a recording method which overwrites an input signal having pulse duration periods and pulse spacing periods to a recording medium by irradiation of an optical beam by a beam emitter to form recording marks corresponding to said pulse duration periods, comprises the steps of: converting said pulse duration period of said input signal to a modulation pattern of pulse string such that:

(I) the pulse width of at least one of the first and second pulses of said pulse string is made greater than the pulse width of each pulse in successive pulses succeeding thereto and made constant irrespective of the length of the recording mark, (II) the pulse width and pulse cycle period of each pulse in said successive pulses is equal to each other, and (III) when forming a recording mark of Mth shortest entry, the number of narrow pulses in the modulation pattern is $\{Ma+b\}$ pulses, wherein a and b are constants, a being a positive integer and b being an integer;

applying a first predetermined power level during the presence of pulse in said modulation pattern and applying a second predetermined power level during the absence of pulse in said modulation pattern to form a modulated signal; and driving said beam emitter by said modulated signal.

According to one preferred embodiment of the present invention, the above item (III) can be rewritten as follow:

(III) when forming a recording mark of length nT with n being an integer between 3 and 11 and T being one cycle period of successive pulses, the number of successive pulses in the modulation pattern is $\{(n-2)a+b\}$ pulses, wherein a and b are constants, a being a positive integer and b being an integer.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 1(a)-1(c), 2(a)-2(b), 3(a)-3(c), and 4(a)-4(c) are waveform diagrams for describing the present invention;

FIGS. 7(a)-7b are waveform diagrams showing relationship between the input signal and modulation patterns;

FIGS. 12(a)-12(b) are diagrams of basic patterns set in the pattern setting circuit;

FIGS. 19 (a)-19 (c) show waveforms observed in the circuit of FIG. 18;

FIGS. 21(a)-21(b) show waveforms observed in the circuit of FIG. 20;

FIGS. 23(a)14 23(c) show diagrams of the recording waveform and recording mark used to describe the prior art recording method.

DETAILED DESCRIPTION OF THE PREFERRED EMBODIMENTS

The present invention is described hereinbelow with reference to the accompanying figures.

Figure 2B:
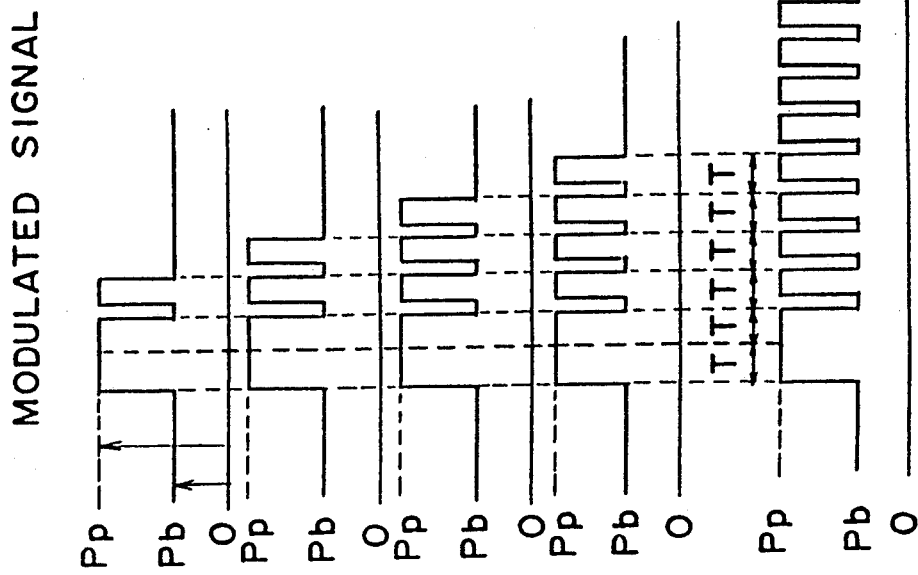
Figure 2A:
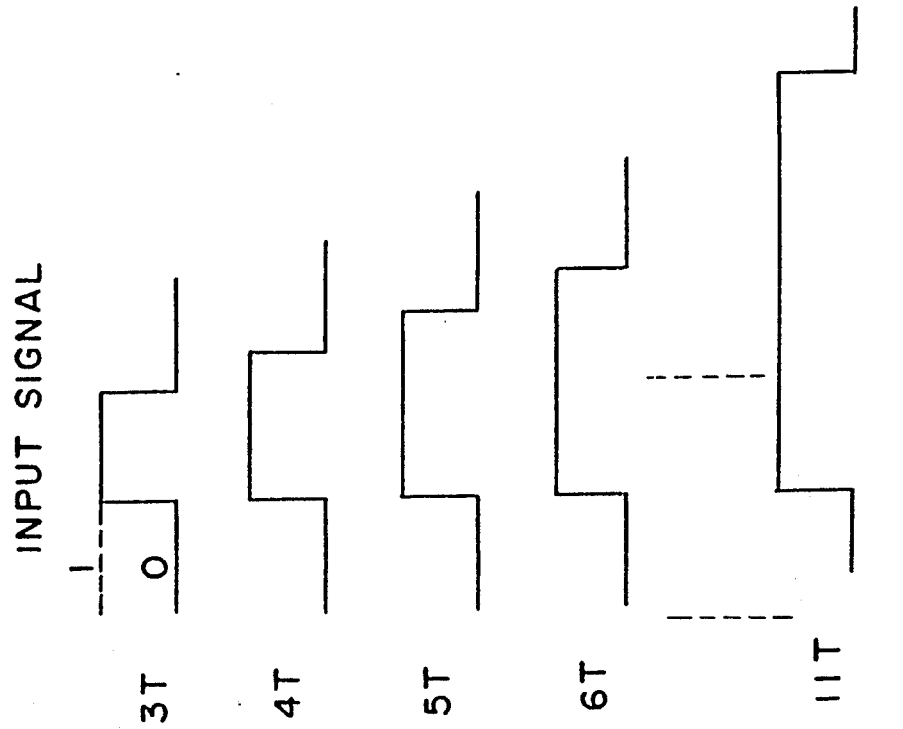
Figures 4A, 4B, 4C:
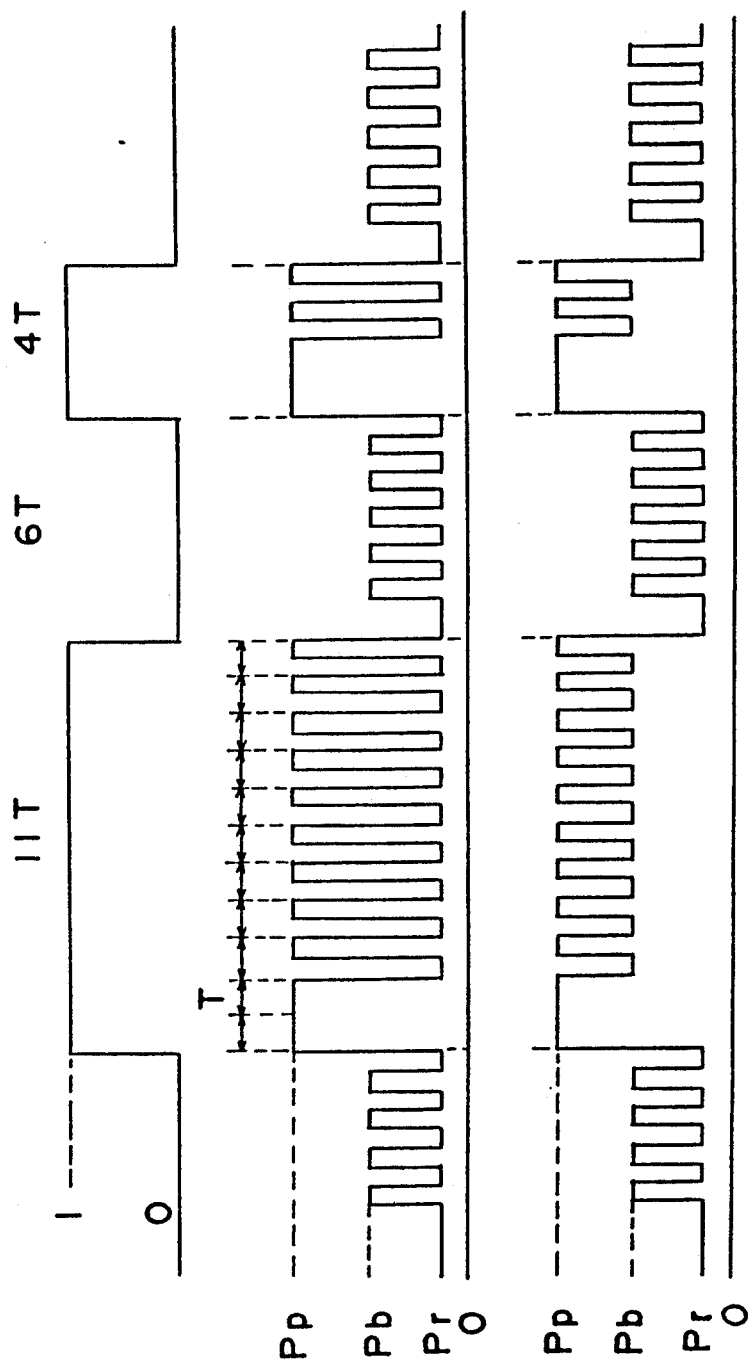

The general feature of the optical information recording system is that when a recording mark is formed according to an input signal while erasing the old signal during signal recording, a pulse width of the input digital signal is either 3T, 4T, 5T, 6T, 7T, 8T, 9T, 10T or 11T, as shown FIG. 2(a) in which T is a unit time. According to the present invention, the input pulse signal as shown in FIG. 2(a) is converted to a modulated signal as shown in FIG. 2(b), and the modulated signal is used for driving the laser beam for forming the recording mark on a recording medium, such as an optical disk. According to the present invention, a modulation pattern (as shown in FIG. 7(b) is used for making the modulated signal as shown in FIG. 2(b), and such a modulated signal is previously stored in a pattern setting circuit. According to the present invention, there are fundamentally four different modulated signals (FIG. 1(b) and FIG. 2(b); FIG. 3(b) and 3(c); FIG. 4(b), waveform (b); and FIG. 4, waveform (c)).

Referring to FIGS. 1(a)-1(c), the first modulated signal is described. It is assumed that a waveform as shown in FIG. 1(a) is produced for the digital recording signal. In this case, the input signal would be as shown in FIG. 1(a), having a pulse duration of 11T, pulse spacing of 6T and another pulse duration of 4T. Based on input signal of FIG. 1(a), a modulated signal as shown in FIG. 1(b) is formed which is used to modulate the laser beam to record the corresponding signal onto an optical disk. The reasons for modulating the laser beam as shown in FIG. 1(b) are described hereinbelow.

In FIG. 1(b), Pb is the erase power level. Thus, by holding the laser power constant at this level, the amorphous area on the optical disk is crystallized, and, accordingly, the old signal is erased.

Furthermore, when recording a new signal, i.e., when forming a new recording mark, the laser power is further increased to a recording power level Pp.

According to the first modulated signal, the pulse duration period is modulated to form a pulse string comprising narrow pulses which vary between the recording power level Pp and erase power level Pb. Furthermore, during the first two unit times (2T), the recording power level Pp is maintained, and thereafter, the power is alternately changed between the erase power level Pb and recording power level Pp at the rate of unit time T.

In other words, according to the present invention, in order to reduce the distortion of the recording mark to become a teardrop shape while also not making the construction of the recording apparatus complex, such a method is employed that (1) modulating the input signal pulse which forms a single recording mark to form a modulated signal comprising multiple narrow pulses, and (2) optimizing the pulse width of the first or second pulse in said modulated signal so that it is wider than the pulse width of any pulses succeeding thereto. Furthermore, a device of simple construction can be achieved by (3) holding the recording power constant and controlling the achieved temperature by varying the pulse width of the pulses in the modulated signal, and (4) maintaining a constant relationship between the pulse width of the input signal and the number of pulses contained in the modulated signal when creating a modulated signal from said input signal. For example, if the pulse width of the input signal becomes greater by a unit of one, the number of narrow pulses in the modulated signal is increased by one. Moreover, according to the present invention, (5) it is necessary to keep the pulse width of the added narrow pulses always constant.

The modulated signals shown in FIG. 2(b) are formed according to the first modulated signal which fulfills the above given criteria (1) to (5).

Specifically, according to the first modulated signal, the bias power Pb for erasing is continuously emitted to the recording track during the signal recording period. When a leading edge of the input pulse signal is detected, the modulation pattern is produced. The modulation pattern has such features that (i) the pulse width of only the first pulse in the modulation pattern is greater than the pulse widths of all pulses succeeding thereto, (ii) the pulse widths of all successive pulses are equal, (iii) one pulse is added for each increase of unit time T in the pulse width of the input signal, and (iv) the laser is modulated and emitted at a power between a bias power Pb and peak power Pp by a modulated signal formed by the modulation pattern wherein the repeat cycle of the successive pulses is T. The first pulse has a pulse width of 2T so as to provide sufficient laser power to the optical disk to defuse and to present an amorphous state.

A recording apparatus employing the modulation method of this type can be simply achieved as will be described in detail later in connection with FIG. 6.

Referring to FIGS. 3(b) and 3(c), the second modulated signal which fulfills the above given criteria (1) to (5) is shown.

According to the second modulated signal, the modulated signal has narrow pulses which vary between peak power level Pp and playback power level Pr or between peak power level Pp and power off level (0 level). In this case, the recording film will cool rapidly after irradiation with a narrow pulse, and formation of an amorphous recording mark is made easier.

In addition, as shown in FIG. 3(c), the playback power level Pr (or power off level) is passed immediately after the detection of the leading edge of the input pulse signal or immediately before the detection of the trailing edge of the input pulse signal, i.e., in the transition from the erase power level Pb and the record power level Pp, and conversely in the transition from the record power level Pp to the erase power level Pb. Thus, the temperature change at the beginning and end of the input pulse signal is made rapid, and the boundary between crystalline and amorphous structures, i.e., the edge position of the recording mark, becomes clearly defined.

Referring to FIG. 4(b), the third modulated signal which fulfills the above given criteria (1) to (5) is shown.

According to the third modulated signal, during the pulse duration period (11T and 4T shown in FIG. 4(a)), the modulated signal has narrow pulses which vary between peak power level Pp and playback power level Pr, and furthermore, during the pulse spacing period (6T shown in FIG. 4(a)), the modulated signal has narrow pulses which vary between erase power level Pb and playback power level Pr.

Referring to FIG. 4 (c), the fourth modulated signal which fulfills the above given criteria (1) to (5) is shown.

According to the fourth modulated signal, during the pulse duration period 11T and 4T shown in FIG. 4(a)), the modulated signal has narrow pulses which vary between peak power level Pp and erase power level Pb, and furthermore, during the pulse spacing period (6T shown in FIG. 4(a)), the modulated signal has narrow pulses which vary between erase power level Pb and playback power level Pr.

According to the third and fourth modulated signals, the modulation pattern is provided not only during the pulse duration periods but also during the pulse spacing periods at which the erase laser beam is produced. Such a modulation pattern provided in the pulse spacing periods is referred to as pulsating pattern. The merit for making the pulsating pattern even during the pulse spacing periods is to distinctly form the recording marks particularly at their edges. Such a merit is further described hereinbelow in connection with FIGS. 5(a)-5(d).

Figure 5A:
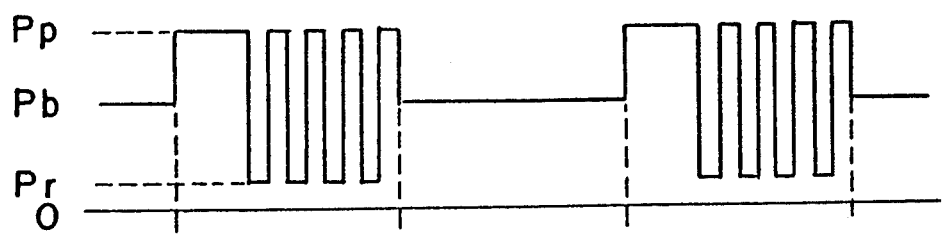
FIGS. 5(a)-5(d) are graphs showing the relationship between the recording waveform and the achieved temperature of the recording film.
Figure 5B:
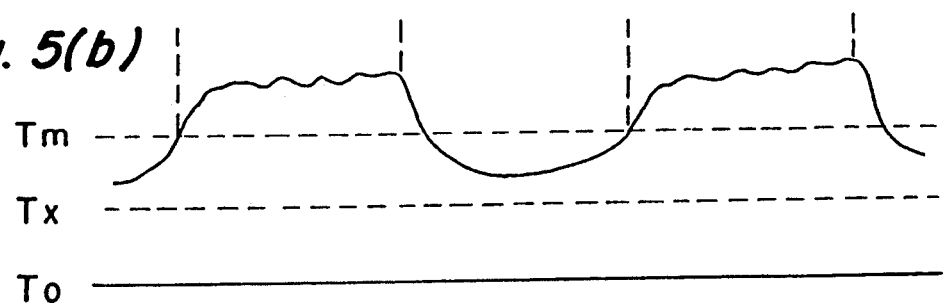
Figure 5C:
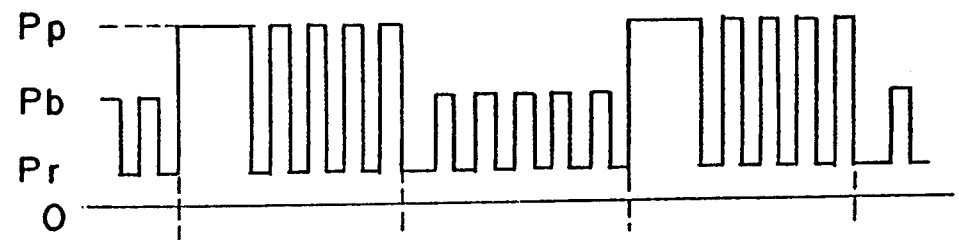
Figure 5D:
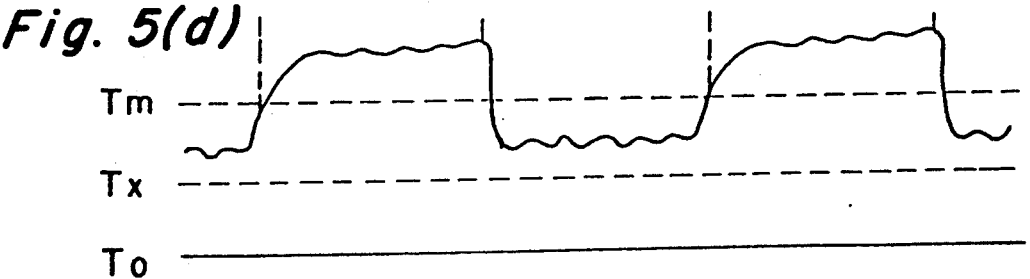

FIGS. 5(a) and 5(c), show the second and third modulated signals, respectively, which are formed without and with erase laser beam modulation. Also, FIGS. 5(b) and 5(d) show the achieved temperature at the recording film resulted from the second and third modulated signals, respectively. By holding the recording film at a temperature greater than or equal to a crystallization temperature Tx, which is greater than room temperature To, the amorphous area crystallizes, and by increasing the temperature greater than melting point Tm, the recording film cools rapidly after melting and converts to an amorphous state. What is important in this is that (1) the achieved temperature of the recording film is held constant during recording mark formation and erasure, and (2) the temperature change can be completed in a short period of time during the transition from recording to erasing and from erasing to recording.

With (1), shape distortion of the recording mark can be minimized and the rate at which the old signal is erased can be held constant, and with (2), the edge position of the beginning and end of the recording mark can be made distinct, thereby reducing jitter in the playback waveform. It is particularly important to rapidly cool at the end of the recording mark to clearly define the edge position.

By pulse modulation of the erase laser beam, a playback power level Pr (or power off level) can be easily provided during the transition from the erase power level Pb to the record power level Pp, and conversely during the transition from the record power level Pp to the erase power level Pb, and the gradual increase in the achieved temperature during erasing can be minimized. It is to be noted that the time period for providing level Pr at the end of the recording mark can be made longer with this recording method than with the method shown in FIG. 3(a). Therefore, rapid cooling can be achieved.

First Embodiment

Figure 6:
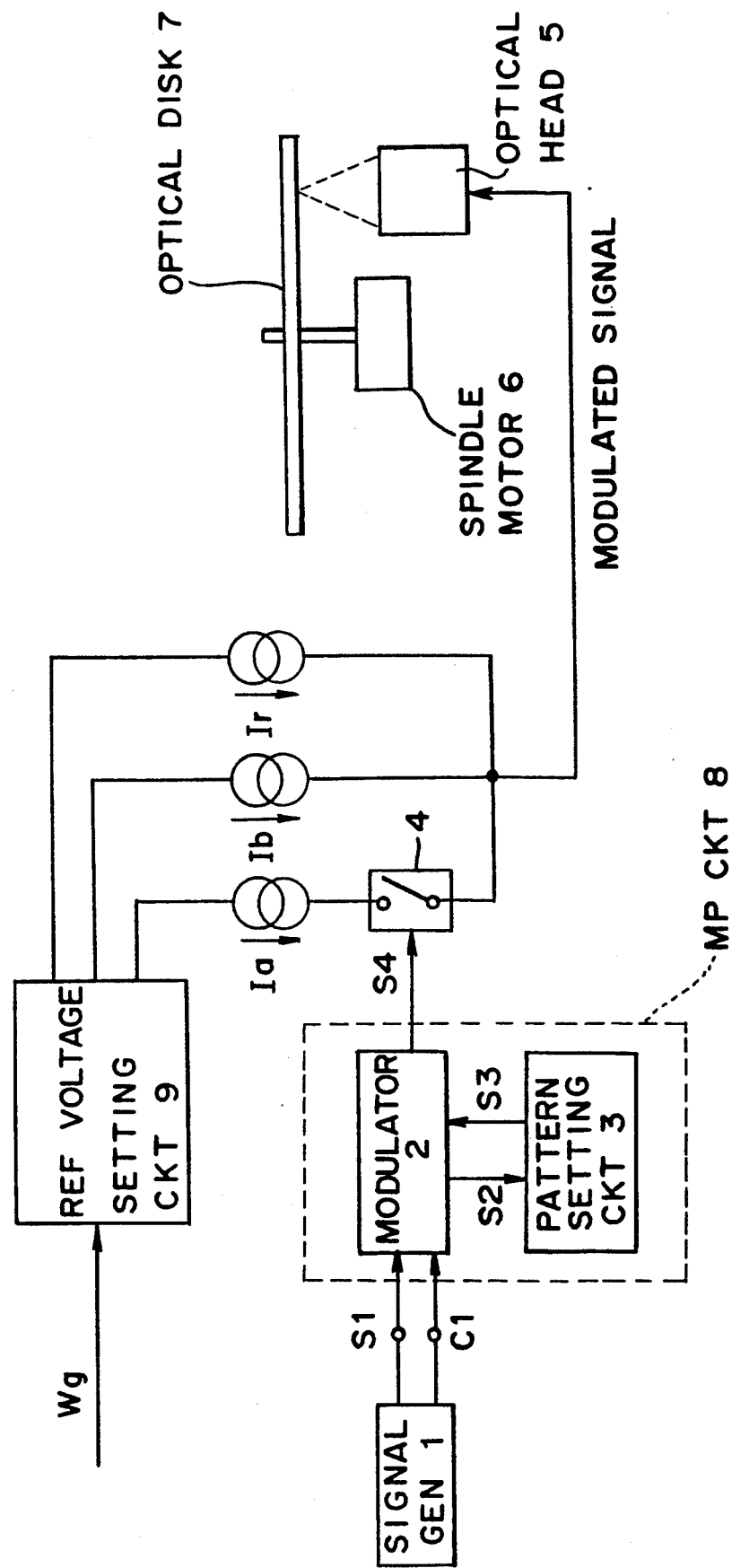
FIG. 6 is a block diagram of a recording apparatus according to a first embodiment of the present invention.

Referring to FIG. 6, an optical information recording apparatus for producing the first modulated signal according to a first embodiment of the present invention is shown. The recording apparatus comprises: a multipulse generation circuit (hereinafter referred to as MP circuit) 8 for receiving an input signal s1, such as shown in FIG. 2(a), and clock signal c1 at a rate of T from a signal generator 1; a reference voltage setting circuit 9 which upon receipt of a gate signal Wg produces a bias current Ia corresponding to power Pp-Pb, a bias current Ib corresponding to power Pb-Pr and a bias current Ic corresponding to power Pr-O; a switch 4 inserted in a line for sending the bias current Ia; an optical head 5 containing a semiconductor laser generator for producing a laser beam having a power relative to the sum of bias currents; and an optical disk 7 driven by a spindle motor 6. The MP circuit 8 includes a modulator 2 and a pattern setting circuit 3 for producing a basic pattern.

Figure 7A:
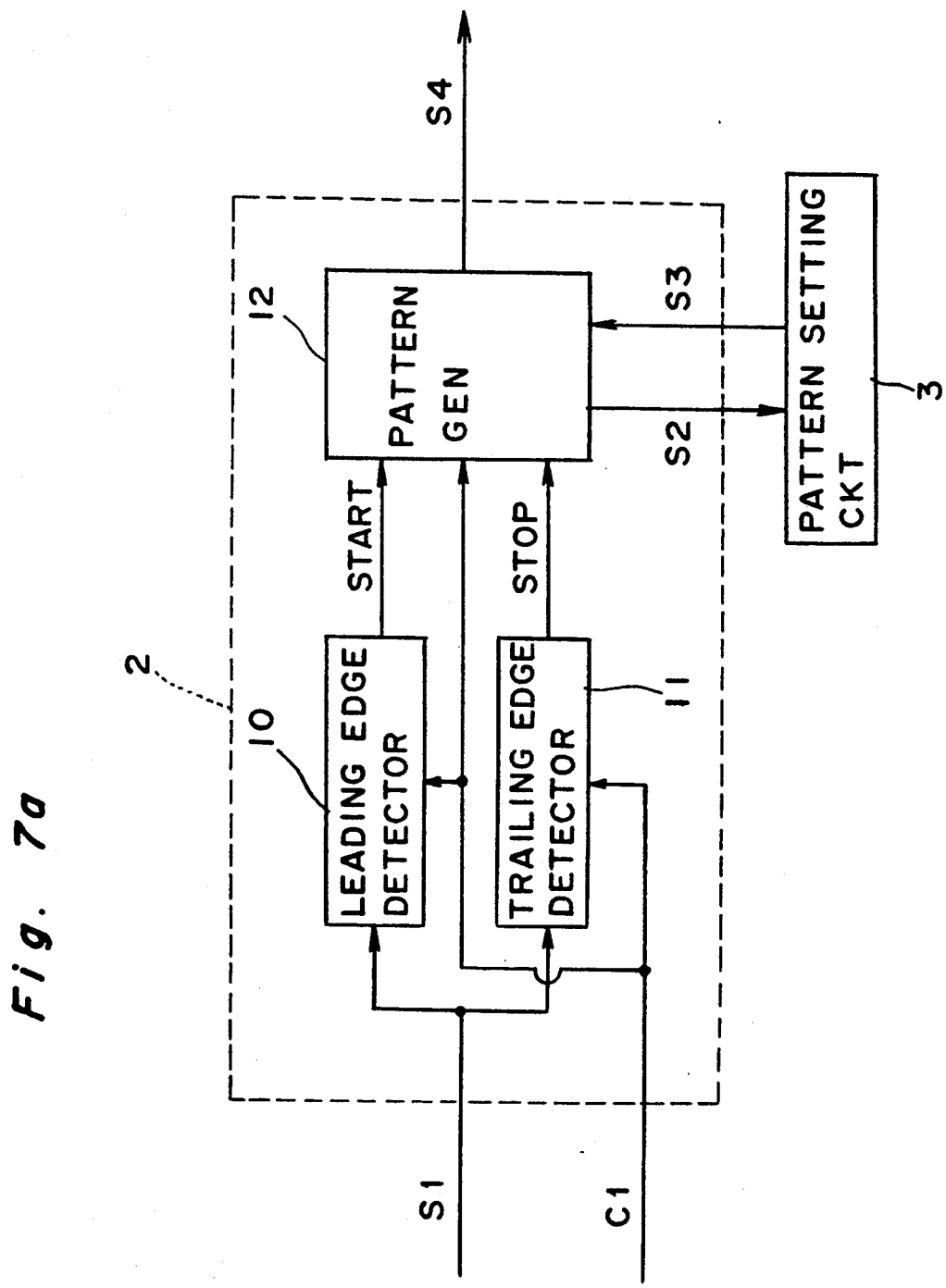
FIG. 7a is a block diagrams showing a detail of a modulator used in the circuit of FIG. 6.
Figure 7B:
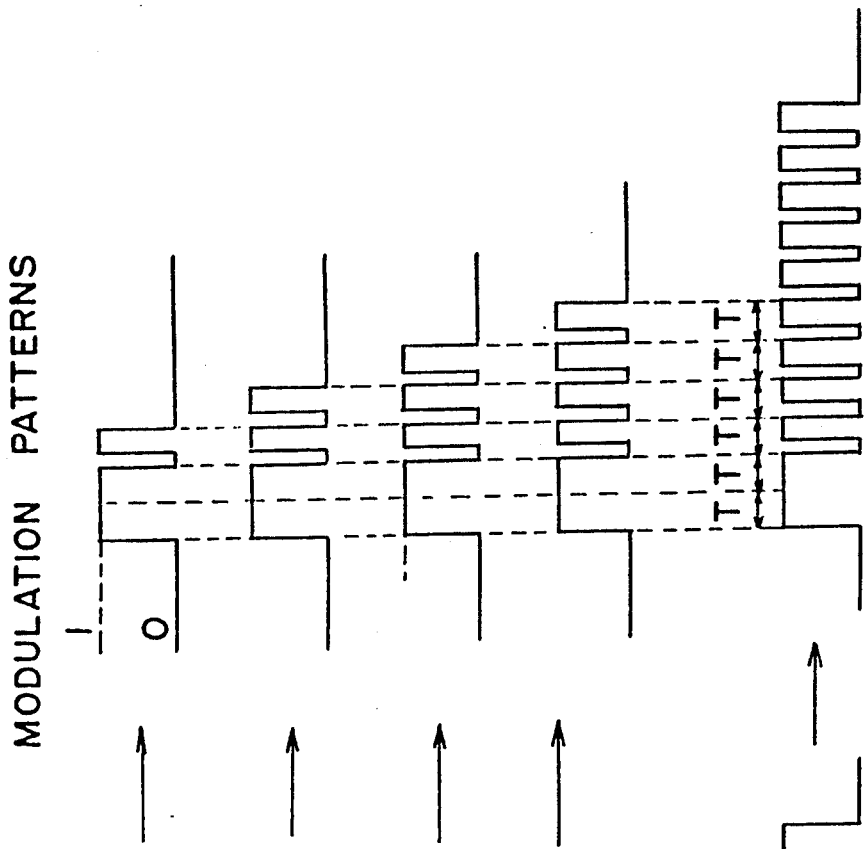

Referring to FIG. 7a, a detail of the modulator 2 is shown, which comprises a leading edge detector 10 and trailing edge detector 11 for detecting, respectively, the leading and trailing edges of the pulse duration period in the input signal s1. Modulator 2 also includes a pattern generator 12 which is coupled with pattern setting circuit 3. Pattern setting circuit 3 generates a predetermined basic pattern of full length 11T changing between "1" and "0", which is substantially the same as the longest modulation pattern such as shown in FIG. 7b(b), bottom row, and applies the basic pattern to the pattern generator 12 in which the basic pattern is used fully partially from its leading edge to produce the modulation pattern.

In response to the detection of the leading edge of the pulse duration period, the leading edge detector 10 produces a start signal to pattern generator 12. The start signal causes the pattern generator 12 to read the full basic pattern (11T long) from pattern setting circuit 3 through line s3, and in turn begins to produce the basic pattern from the beginning along line s4, in synchronized manner with clock c1. Thereafter, when the trailing edge detector 11 detects the trailing edge of the pulse duration period, the trailing edge detector 11 produces a stop signal to the pattern generator 12. This stop signal causes the pattern generator 12 to interrupt the output of the basic pattern.

For example, as shown in FIG. 7b(b), first row, if the stop signal is produced after time period 3T from the start signal, the pattern generator 12 produces only a portion (3T) of the full basic pattern from the beginning. Similarly, as shown in FIG. 7b(b), fourth row, if the stop signal is produced after time period 6T from the start signal, pattern generator 12 produces only a portion (6T) of the full basic pattern from the beginning. Furthermore, as shown in FIG. 7b(b), bottom row, if the stop signal is produced after time period 11T from the start signal, the pattern generator 12 produces the full basic pattern (11T).

Thus, the basic pattern is produced from pattern generator 12 fully or partially depending on the length of the pulse duration period. The full or partial basic pattern as produced from the pattern generator 12 is referred to as a modulation pattern.

In operation of the optical information recording apparatus of FIG. 6, during the signal recording mode and when recording gate signal Wg is input to reference voltage setting circuit 9, bias currents Ic and Ib required to obtain bias power (i.e., erase power) Pb at optical head 5 are produced and supplied to the semiconductor laser. Also, bias current Ia is produced, but is cut off at switch 4. Then, when a recording signal s1, particularly the pulse duration period, is produced from signal generator 1, MP circuit 8 produces the modulation pattern, i.e., a full or a portion of the basic pattern, such as shown in FIG. 7b(b) in a manner described above. The modulation pattern is applied through line s4 to switch 4 which is turned on and off in response to "1" and "0" of the modulation pattern. Thus, the bias current Ia corresponding to power Pp-Pb is intermittently transmitted through switch 4 relative to the modulation pattern, and is superimposed on bias currents Ib+Ir, thereby producing a first modulated signal. The semiconductor laser built in the optical head 5 is driven by the first modulated signal, and the optical disk 7 turned by the spindle motor 6 is irradiated by the laser beam produced by the first modulated signal, thereby effecting the overwriting with the first modulated signal.

Since the leading and trailing edge detectors 10 and 11, and pattern generator 12 operate in synchronism to clock C1, jitter can be suppressed in the modulation pattern, thus in the first modulated signal.

The major feature of this device is the modulation of input signal s1 to form the first modulated signal. The input signal s1 to be recorded is first input from the signal generator 1 to the modulator 2. At this stage, the input signal s1 is processed through pulse width modulation (PWM) to obtain a modulation pattern.

As has been described above, according to the first embodiment, the first basic pattern of full length (11T) is previously stored in the pattern setting circuit 3. The modulator 2 detects the pulse width of each pulse duration period in input signal s1, and permits only the necessary length from the beginning of the basic pattern according to the length of the detected pulse width to be outputted as the modulation pattern, and outputs the modulation pattern from the modulator 2 to operate switch 4.

Therefore, all patterns having different lengths 3T, 4T, 5T, 6T, 7T, 8T, 9T, 10T and 11T determined by the input signal s1 can be presented in a form of a modulation pattern by using only one basic pattern. In addition, the basic pattern can be easily changed, if necessary, to an appropriate basic pattern so that distortion in the playback waveform is minimized.

The reference voltage setting circuit 9 may be so arranged that it generates the voltage required to obtain bias currents Ib and Ia when the recording gate signal Wg is input. When the recording gate signal Wg is off, the semiconductor laser is emitting at the playback power level Pr, and therefor current Ir is supplied.

Figure 8:
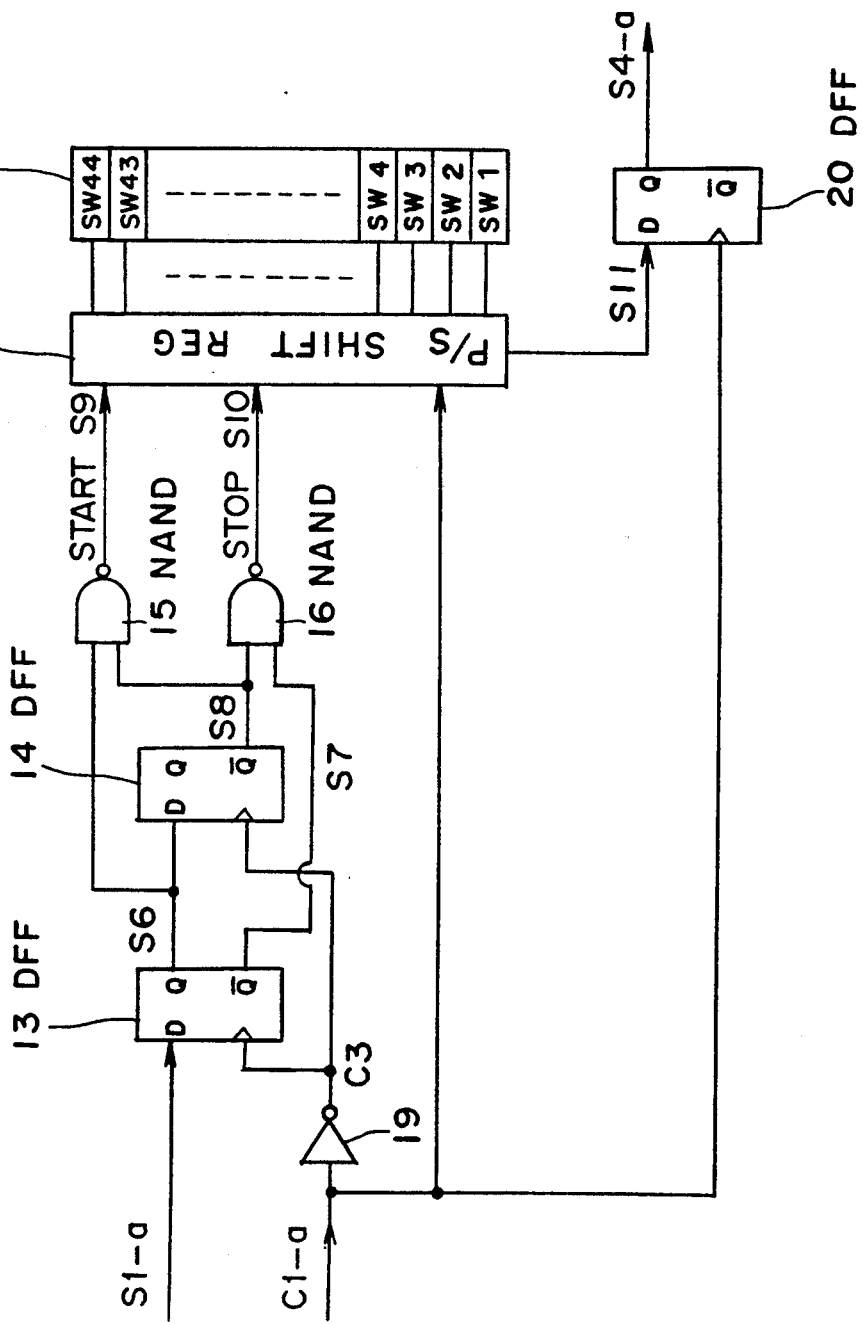
FIG. 8 is a block diagrams showing a detail of another modulator used in the circuit of FIG. 6.

Referring to FIG. 8, an example of MP circuit 8 used in the circuit of FIG. 7a is shown. In this embodiment, the input signal s1-a is the EFM ([-14 modulation) signal which is usually used for recording the CDs of the read-only type. The EFM signal is a PWM signal comprising pulses of nine different pulse widths varying from 3T to 11T where T (=230 nsec) is the clock cycle controlled by clock. The modulation pattern s4-a is used for operating switch 4 to drive the laser as described above in connection with FIG. 6, and the signal is written to the optical disk. The optical disk used is a phase-change type rewritable medium with a structure as shown in FIG. 9.

Figure 9:
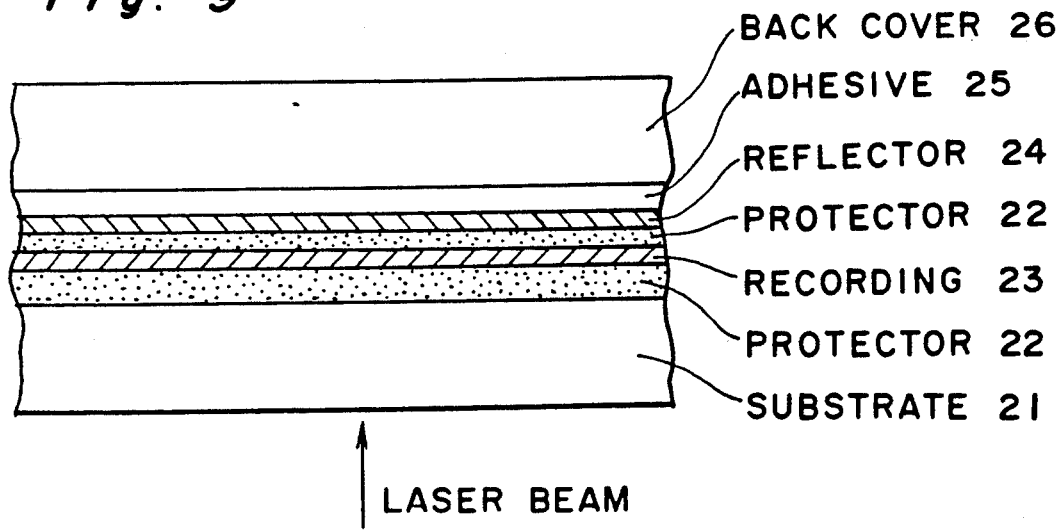
FIG. 9 is cross-sectional view of an optical disk upon which a signal is recorded.

Referring to FIG. 9, an optical disk substrate 21 is formed by a 5" polycarbonate substrate to which the signal recording track is previously formed. A recording film 23 is made of TeGeSb having a film thickness of 400 angstroms. The recording film is sandwiched between ZnS protective layers 22, and a Au reflective layer 24 is provided on the side opposite that of laser beam incidence. A back cover 26 is provided to protect these thin layers. The signal recorded and erased states correspond to the amorphous and crystalline states, respectively, of the recording film. In signal recording tests, a signal is prerecorded to the recording track, and a new signal is recorded by single beam overwriting while erasing the old signal. The relative velocity of the optical disk and the recording spot where the focused laser beam impinges is 1.25 m/sec.

Measurement of jitter in the reproduced signal is used to evaluate the recorded signal. Jitter is defined by using the zero crossing of the playback waveform as the evaluation level, repeatedly measuring the time from one zero crossing to the next zero crossing at each pulse of the nine differing pulse widths to obtain the standard deviation.

Referring back to FIG. 8, the MP circuit includes: D flip-flops 13 and 14 and NAND gates 15 and 16 which constitutes the leading and trailing edge detectors 10 and 11 shown in FIG. 7a; 44 switches SW1–SW44 defining the pattern setting circuit 3 so as to make the basic pattern of 11T length; and a parallel-in/serial-out shift register 17 defining the pattern generator 12 which receives the basic pattern as stored in switches SW1–SW44. In this example, switches SW9, SW13, SW17, SW21, SW25, SW29, SW33, SW37, SW41 are off, and the remaining switches are on to form the basic pattern. Any other desired pattern can therefore be created by turning these switches on and off in different pattern.

Figure 10:
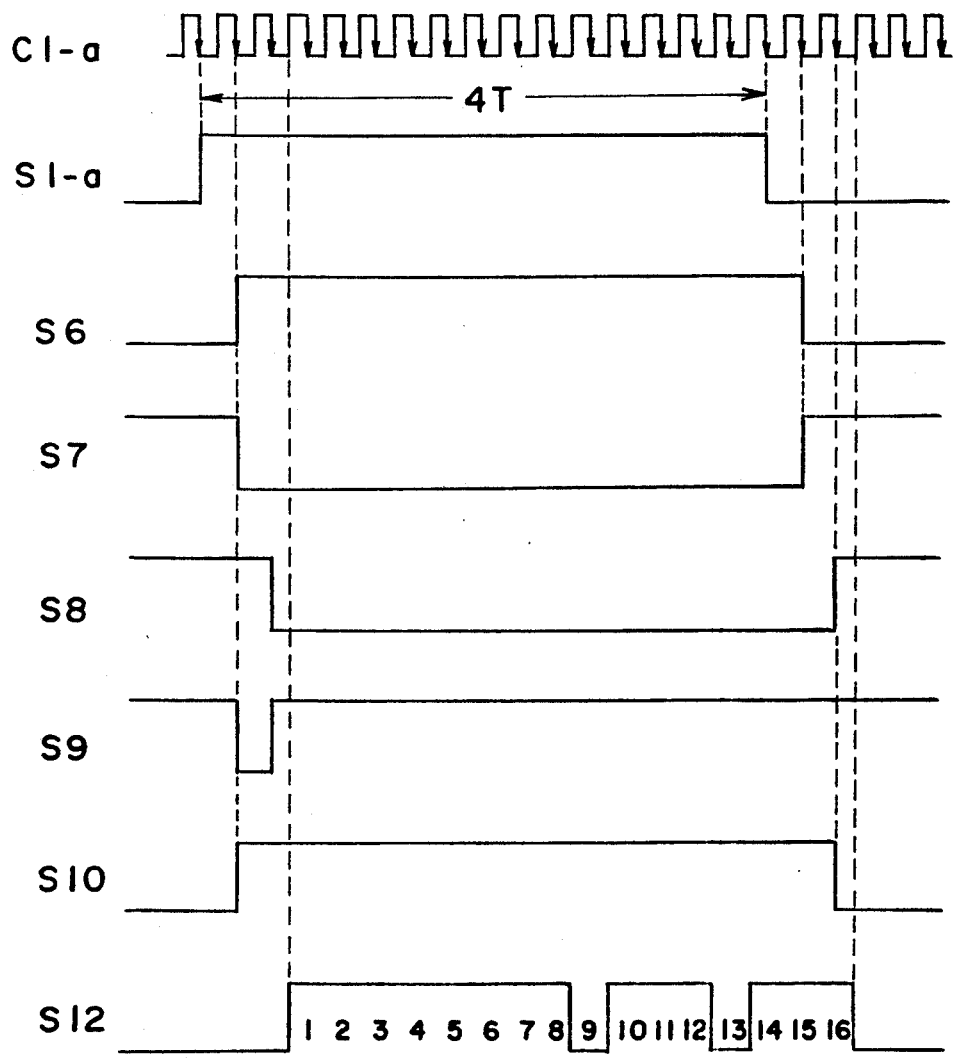
FIG. 10 is a timing chart describing the flow of the signal in the circuit shown in FIG. 8.

The operation of the MP circuit shown in FIG. 8 is described hereinbelow with reference to the timing chart in FIG. 10.

The clock c1-a is one-fourth (T/4) the clock cycle T of the EFM input signal s1-a. The timing chart shown in FIG. 10 shows a case in which pulse duration period of 4T long is applied as the input signal.

First, in response to the leading edge of the EFM input signal s1-a of 4T long, a start signal s9 is produced by the D flip-flops 13 and 14, and NAND 15 in synchronized manner with clock c1-a. Thus, the parallel-in/serial-out shift register 17 reads the basic pattern from the pattern setting circuit 3, and starts outputting the basic pattern from its leading edge in synchronized with clock c1-a.

Thereafter, in response to the trailing edge of the EFM input signal s1-a of 4T long, a stop signal s10 is produced in a synchronized manner with 16th clock c1-a, corresponding to 4T long. This stop signal causes the parallel-in/serial-out shift register 17 to stop sending out the basic pattern stored in the register 17. Thus, up to this time, data corresponding to SW1–SW16 are sent out from register 17 through D flip-flop 20 as modulation pattern S4-a. It is to be noted that since the D flip-flop 20 is synchronized with clock c1-a, the jitter is reduced. Accordingly, it is possible to create modulation patterns of different lengths 3T to 11T using one basic pattern of length 11T.

In the tests, the device as described above is used to produce the first modulated signal. The EFM input signal is converted to the modulated signal as shown in FIG. 2(b), so as to drive the laser. The overwritten signal is read and the jitter in the playback signal is measured. The bias power Pb used for overwriting is 4 mW.

Figure 11:
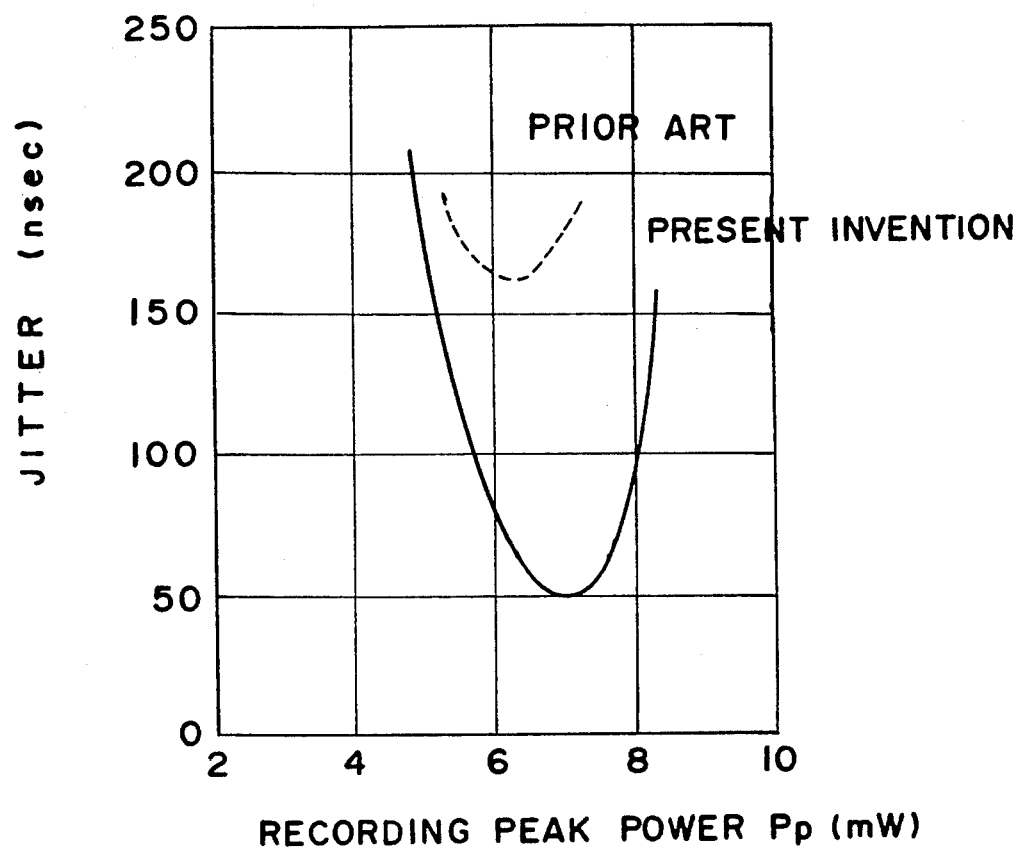
FIG. 11 is a graph showing the relationship between jitter and recording peak power.

The test results are obtained by measuring relationship between recording peak power Pp (the value at the surface of the optical disk) and jitter, and are shown in FIG. 11. In FIG. 11, the results of jitter measurements of signals overwritten according to the present invention and the prior art are compared under such condition that the EFM signal is used to directly modulate the laser during signal overwriting. Jitter is measured by the amount of shifting of the zero crossing point. As will be understood from FIG. 11, jitter in the playback waveform according to the present invention is reduced because of the reduced recording mark shape distortion, and there is a reduction in the playback signal error rate and improvement in recording density in the case of the present invention.

In FIG. 8, pattern setting circuit 3 is formed by a plurality of switches SW1–SW44, but alternatively, it can be formed by the use of a ROM or RAM device wherein the predetermined basic patterns are stored. If a semiconductor storage device is used, this circuit will contain no delay elements, thus enabling circuit integration and a more compact device.

An important feature of a recording apparatus according to the present invention is that whether the pattern setting circuit is a switch bank or semiconductor storage device, the optimal patterns for optical disks of different varieties can be selected by simply changing the basic pattern.

Possible Basic Patterns

Next, different basic patterns are described.

The relationship between the basic pattern and jitter is obtained using the device described in the first embodiment with the basic pattern being varied. The input signal, optical disk, relative velocity of the optical disk and the recording spot, bias power, and jitter measurement method are the same as those described in the above embodiment. The shapes of the tested basic patterns are shown in FIGS. 12(a)–12(o), and the values of the jitter measured in the playback signal resulting from the signal recorded according to each pattern are shown in Table 1. The jitter values as obtained are the minimum values when the recording peak power was varied. The recording peak power is also shown in Table 1 as obtained at the time of the measured jitter value.

TABLE 1

| Pattern | Jitter (nsec) | Recording peak power (mw) |
|---|---|---|
| FIG. 12 (a) | 50 | 7.0 |
| FIG. 12 (b) | 60 | 8.3 |
| FIG. 12 (c) | 60 | 10.0 |
| FIG. 12 (d) | 70 | 8.5 |
| FIG. 12 (e) | 60 | 6.8 |
| FIG. 12 (f) | 40 | 6.8 |
| FIG. 12 (g) | 40 | 6.9 |
| FIG. 12 (h) | 105 | 8.3 |
| FIG. 12 (i) | 65 | 6.9 |
| FIG. 12 (j) | 40 | 7.0 |
| FIG. 12 (k) | 130 | 7.3 |
| FIG. 12 (l) | 160 | 6.3 |
| FIG. 12 (m) | 40 | 7.3 |
| FIG. 12 (n) | 35 | 8.6 |

TABLE 1-continued

| Pattern | Jitter (nsec) | Recording peak power (mw) |
|---|---|---|
| FIG. 12 (o) | 35 | 10.5 |

As apparent from Table 1, jitter is reduced to less than 100 nsec with all patterns except FIG. 12(h), FIG. 12(k), and FIG. 12(l). Therefore, basic patterns other than FIG. 12(h), FIG. 12(k), and FIG. 12(l) are understood as being included in the present invention.

In particular, jitter at the maximum 50 nsec or less is observed with basic patterns FIG. 12(a), FIG. 12(f), FIG. 12(g), FIG. 12(j), FIG. 12(m), FIG. 12(n), and FIG. 12(o). The feature of these patterns is that the pulse width of the first or second pulse in the basic pattern of the pulse string is wide, the narrow pulses succeeding thereto are each of an equal pulse width and pulse interval, and the cycle of said narrow succeeding pulses is T such that for each one unit increase in the length of the recording mark, one narrow pulse of cycle T is added to the pulse string of the modulation pattern.

In other words, according to the present invention, (I) the pulse width of the first or second, or first and second pulses at the beginning of the basic pattern is greater than the pulse width of each pulse in a successive narrow pulses succeeding thereto in the basic pattern and constant irrespective of the length of the recorded mark, (II) the pulse width and pulse cycle period of each pulse in said successive narrow pulses is equal to each other therein, and (III) when forming a recording mark of length nT (n is an integer between 3 and 11), the number of narrow pulses in the modulation pattern is {(n-2)a+b} pulses, wherein a and b are constants, a being a positive integer and b being an integer.

It is to be noted that the values a and b of each pattern FIG. 12(a), FIG. 12(f), FIG. 12(g), FIG. 12(j) FIG. 12(m), FIG. 12(n), and FIG. 12(o) described above are: a=1, b=0 for patterns FIG. 12(a), FIG. 12(j); and a=1, b=−1 for FIG. 12(f), FIG. 12(g), FIG. 12(m), FIG. 12(n), and FIG. 12(o).

From a broader aspect of the present invention, the above item (III) can be defined as such that, (III') when forming a recording mark of Mth shortest entry, the number of narrow pulses in the modulation pattern is {Ma+b} pulses, wherein a and b are constants, a being a positive integer and b being an integer.

Furthermore, while the MP circuit used in this test divides the 11T signal pulse into 44 units, the pulse width of the successive pulses can be made T/8 if the signal pulse is further divided into 88 units. However, finer division will cause the clock frequency of the MP circuit to become too high, and circuit design will become difficult. Considering the results shown in Table 1 and the ease of circuit design, it is considered preferable that the pulse width of the successive pulses is between a minimum T/8 and a maximum T/2.

Recording Speed

Figure 13:
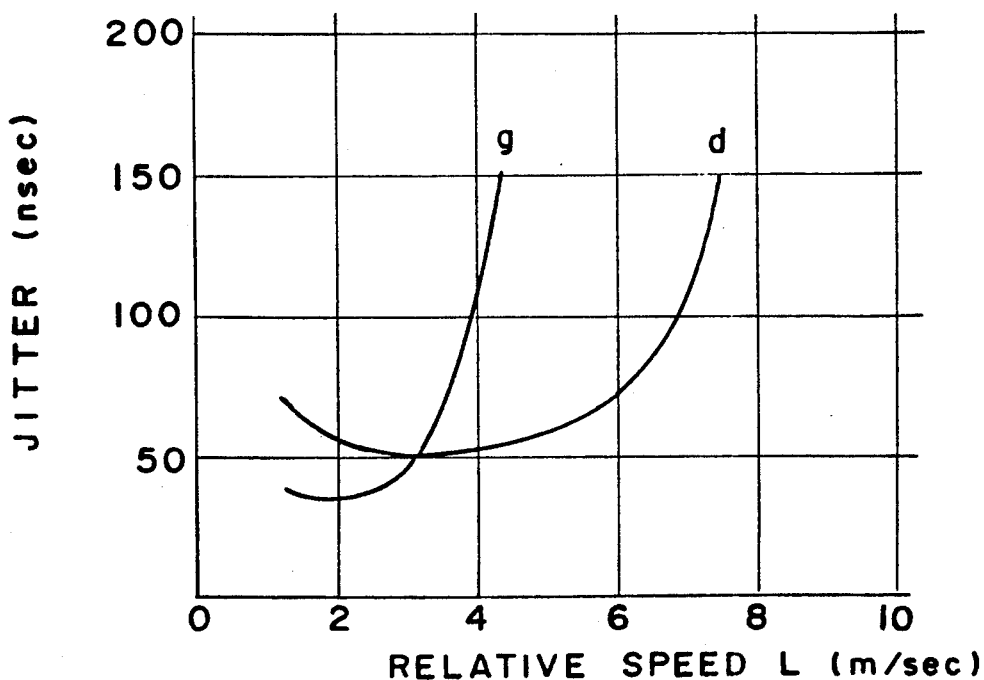
FIG. 13 is a graph showing the relationship between jitter and relative speed.

The jitter levels resulting from signals recorded at different relative speeds of the optical disk to the recording spot are obtained using the same device as that described above using basic patterns FIG. 12(d) and FIG. 12(g). The input signal, optical disk, and jitter measurement method are the same as those in the above described embodiment. The relationship between relative speed and the jitter levels measured in the playback signal are shown in FIG. 13. The recorded jitter levels at the minimum points are obtained with respect to different combinations of the recording peak power and bias power.

Jitter increased in both patterns FIG. 12(g) and FIG. 12(d) at high relative speeds. The increase in jitter occurs at a lower relative speed with pattern FIG. 12(g) than with pattern FIG. 12(d). Such a lower relative speed is obtained at a point at which the repeat cycle $\tau$ {T=230 nsec in pattern (g), T/2 =115 nsec in pattern (d)} of the succeeding pulses becomes greater than $\lambda/L$, wherein $\lambda$ is the wavelength of the laser (0.83$\mu$ in the present embodiment) and L is the relative speed. This is considered due to the distortion occurring in a recording mark resulting from intermittent laser beam emissions reaching an order equal to that of the wavelength of the laser beam and thus being optically reproduced, thereby resulting in distortion in the playback waveform which causes an increase in the jitter level. Therefore, it is preferred that the repeat cycle of the successive pulses be set so that $$\tau \leq \lambda/L$$

where
$\tau$: repeat cycle of the successive pulses
$\lambda$: wavelength of the laser beam
L: relative velocity of the optical disk to the recording spot.

Second Embodiment

In the first embodiment described above, the recording apparatus for producing the first modulated signal which change between the bias power level Pb and the peak power level Pp such as shown in FIG. 1(b) is described. In the second embodiment, a recording apparatus for producing the second modulated signal which change between the peak power level Pp and the playback power level Pr such as shown in FIGS. 3(b) and 3(c) is described.

Figure 14:
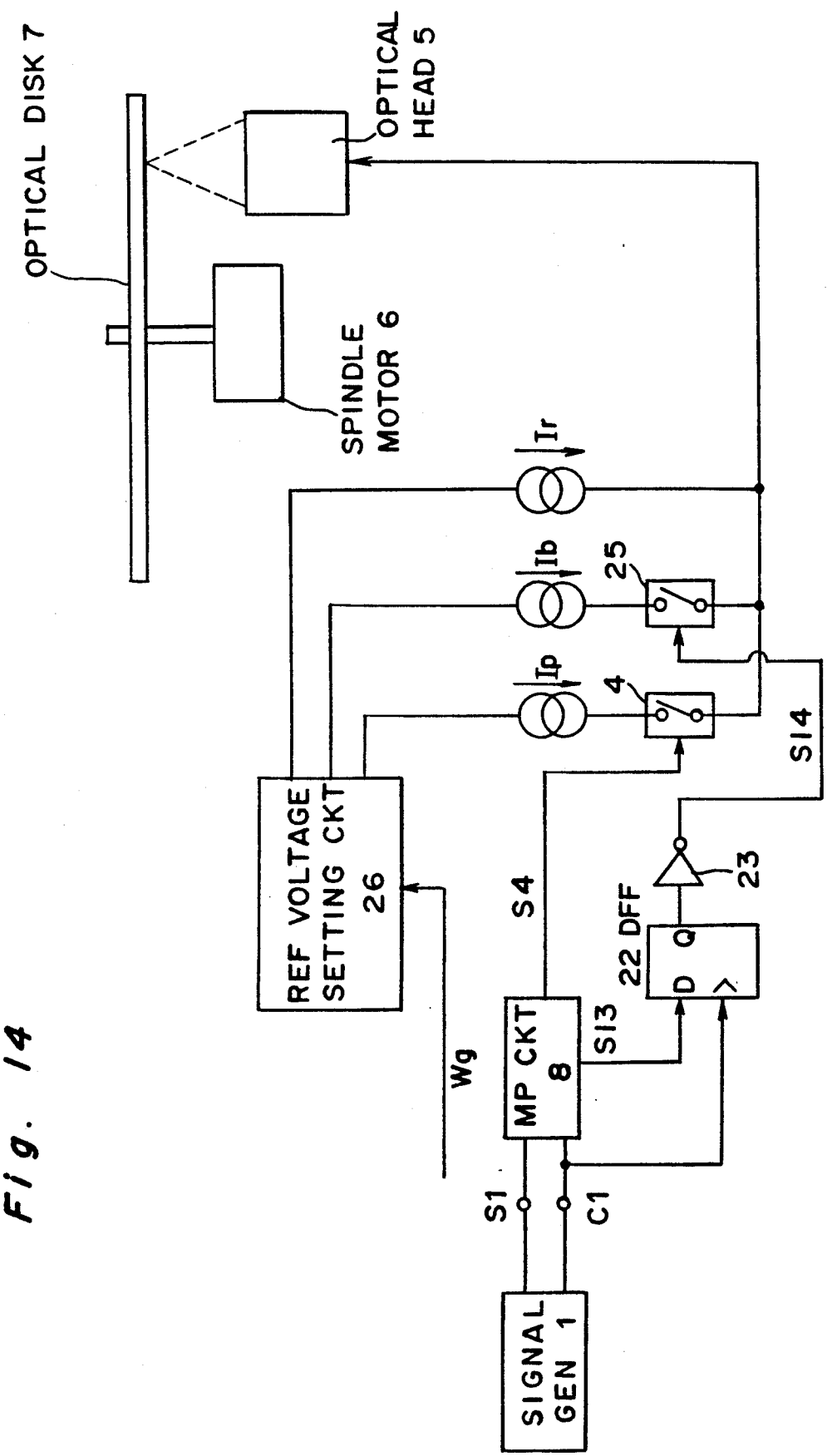
FIG. 14 is a block diagram of a recording apparatus according to a second embodiment of the present invention.

Referring to FIG. 14, an optical information recording apparatus for producing the second modulated signal according to a second embodiment of the present invention is shown. When compared with the first embodiment, the recording apparatus of the second embodiment further comprises a data flip-flop 22 for receiving data from MP circuit 8, and a switch 25 inserted in a line for sending the bias current Ib and is connected through an invertor 23 to D flip-flop 22. MP circuit 8 includes the circuit shown in FIG. 8 so as to use the Q output from D flip-flop 14 of FIG. 8 as the D input to D flip-flop 22 of FIG. 14.

Furthermore, according to the second embodiment, the reference voltage setting circuit 26 produces bias current Ip instead of bias current Ia. In this embodiment, the bias current Ip corresponds to power Pp-Pr.

Figure 15:
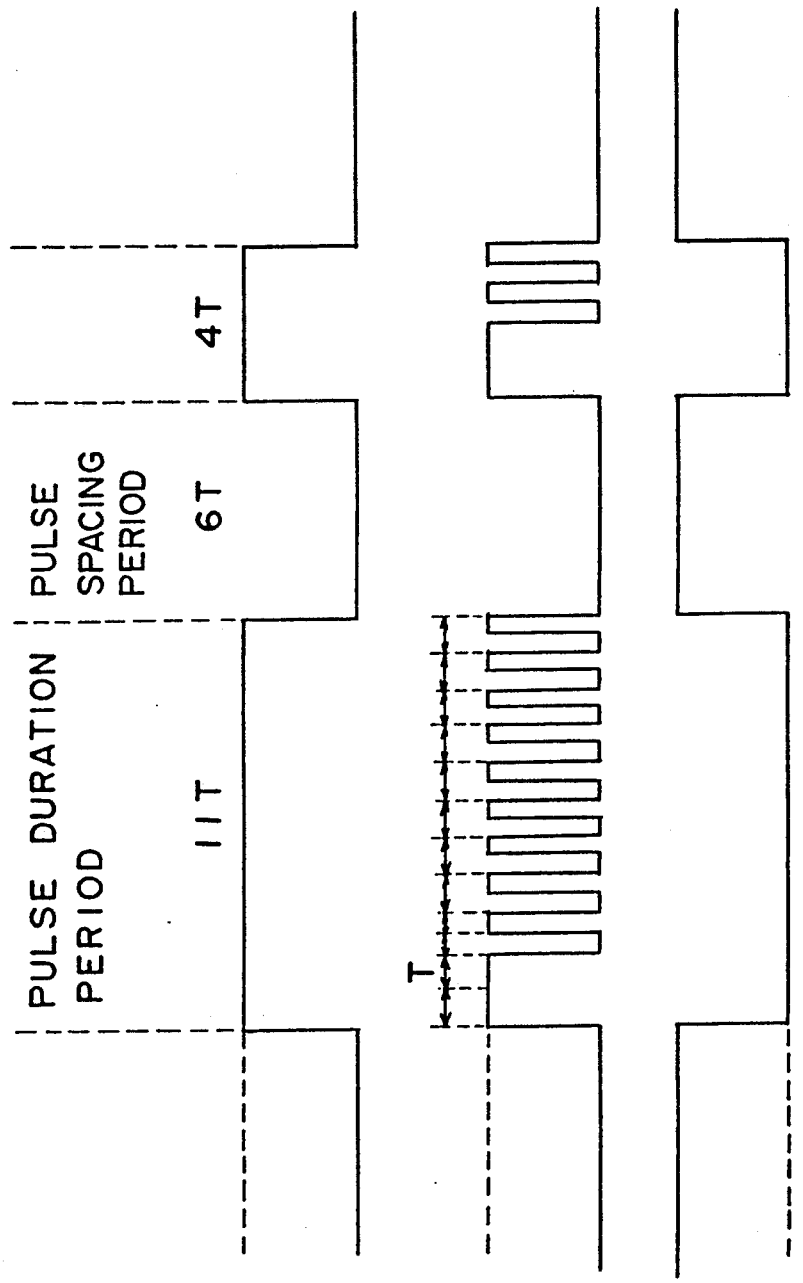
FIGS. 15(a)-15(c) show waveforms observed in the circuit of FIG. 14.

In operation, when the signal generator 1 produces the input signal s1, such as shown in FIG. 15(a), MP circuit 8 produces on line s4 the modulation pattern such as shown in FIG. 15(b), and at the same time, invertor 23 produces on line s14 a control signal such as shown in FIG. 15(c).

Thus, during the pulse duration period, switch 4 is alternately turned on and off in accordance with FIG. 15(b), and at the same time, switch 25 is maintained off in accordance with FIG. 15(c). Thus, during the pulse duration period, the sum of pulse current Ip, corresponding to power Pp-Pr, and continuous current Ir, corresponding to power Pr-O, as best shown in FIGS. 3(a)-3(c) is provided for driving the laser, thereby effecting the overwriting with the second modulated signal.

During the pulse spacing period, switch 4 is maintained off and switch 25 is maintained on. Thus, during the pulse spacing period, the sum of continuous current Ib, corresponding to power Pb-Pr, and continuous current Ir, corresponding to power Pr-O, is provided for driving the laser, thereby effecting the erasing.

It is to be noted that if the reference voltage setting circuit 26 is set so that Ir is not supplied when the recording gate signal Wg is input, the modulation pattern is used for making a modulated signal which varies between Pp and the power off level.

Tests are carried out to find out the effect of the second embodiment. In the tests, the basic patterns as shown in FIGS. 12(a),12(f), and 12(m) are used. The input signal, optical disk, relative velocity of the optical disk and the recording spot, bias power, and jitter measurement method are the same as those used in the first embodiment. The test results showing the values of the jitter measured in the playback signal are shown in Table 2. The jitter values as obtained are the minimum values when the recording peak power was varied. The recording peak power is also shown in Table 2 as obtained at the time of the measured jitter value.

TABLE 2

| Pattern | Jitter (nsec) | Recording peak power (mw) |
|---|---|---|
| FIG. 12 (a) | 45 | 8.3 |
| FIG. 12 (f) | 35 | 8.0 |
| FIG. 12 (m) | 30 | 8.6 |

These results show a jitter level that is less than that for each same pattern in Table 1. This is because the cooling rate after irradiation with a short pulse is high during recording mark formation, thereby making the amorphous phase change easy, and resulting in a large recording mark. The jitter reduction effect is particularly great with the basic pattern FIG. 12(m). This is because in the transition from the bias power level Pb to the peak power level Pp, and conversely from the peak power to the bias power level, the playback power level Pr is passed through, thereby resulting in a rapid change in the recording film temperature before and after the recording mark, and thus causing the edge position of the recording mark to be clearly defined.

Third Embodiment

Figure 16:
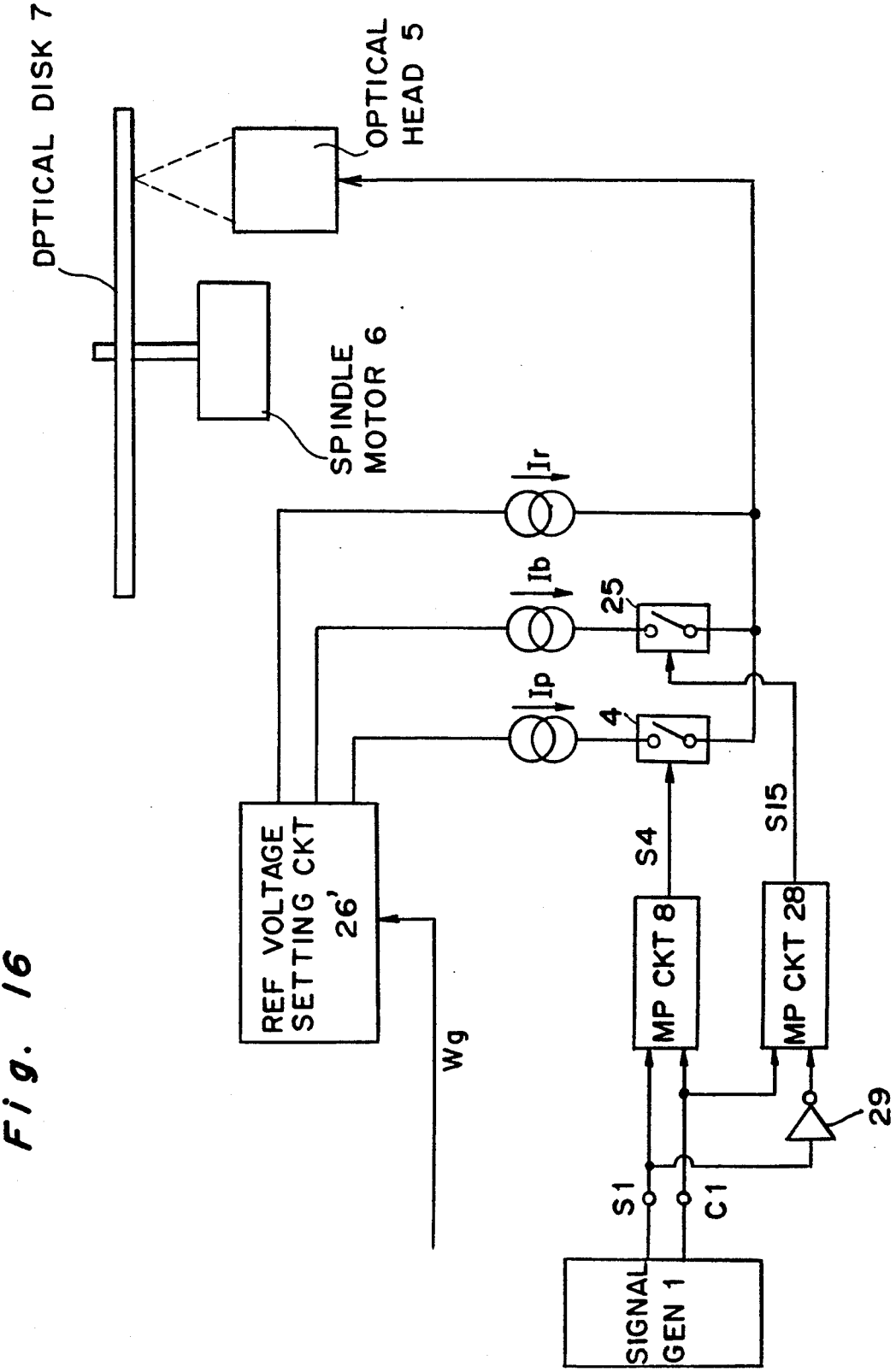
FIG. 16 is a block diagram of a recording apparatus according to a third embodiment of the present invention.

Referring to FIG. 16, an optical information recording apparatus for producing the third modulated signal (FIG. 4(b), according to a third embodiment of the present invention is shown. When compared with the first embodiment, the recording apparatus of the third embodiment further comprises a second MP circuit 28 which receives input signal S1 through an invertor 29 and clock C1 and produces a pulsating signal applied to a switch 25 inserted in a line for sending the bias current Ib. MP circuit 28 has the same structure as MP circuit 8. Instead of the basic pattern, pattern setting circuit 3 used in MP circuit 28 is previously stored with a pulsating pattern, such as shown in FIG. 17(a).

Furthermore, according to the third embodiment, the reference voltage setting circuit 26' produces bias current Ip instead of bias current Ia, as in the second embodiment. In this embodiment, the bias current Ip corresponds to power Pp-Pr.

Figure 17:
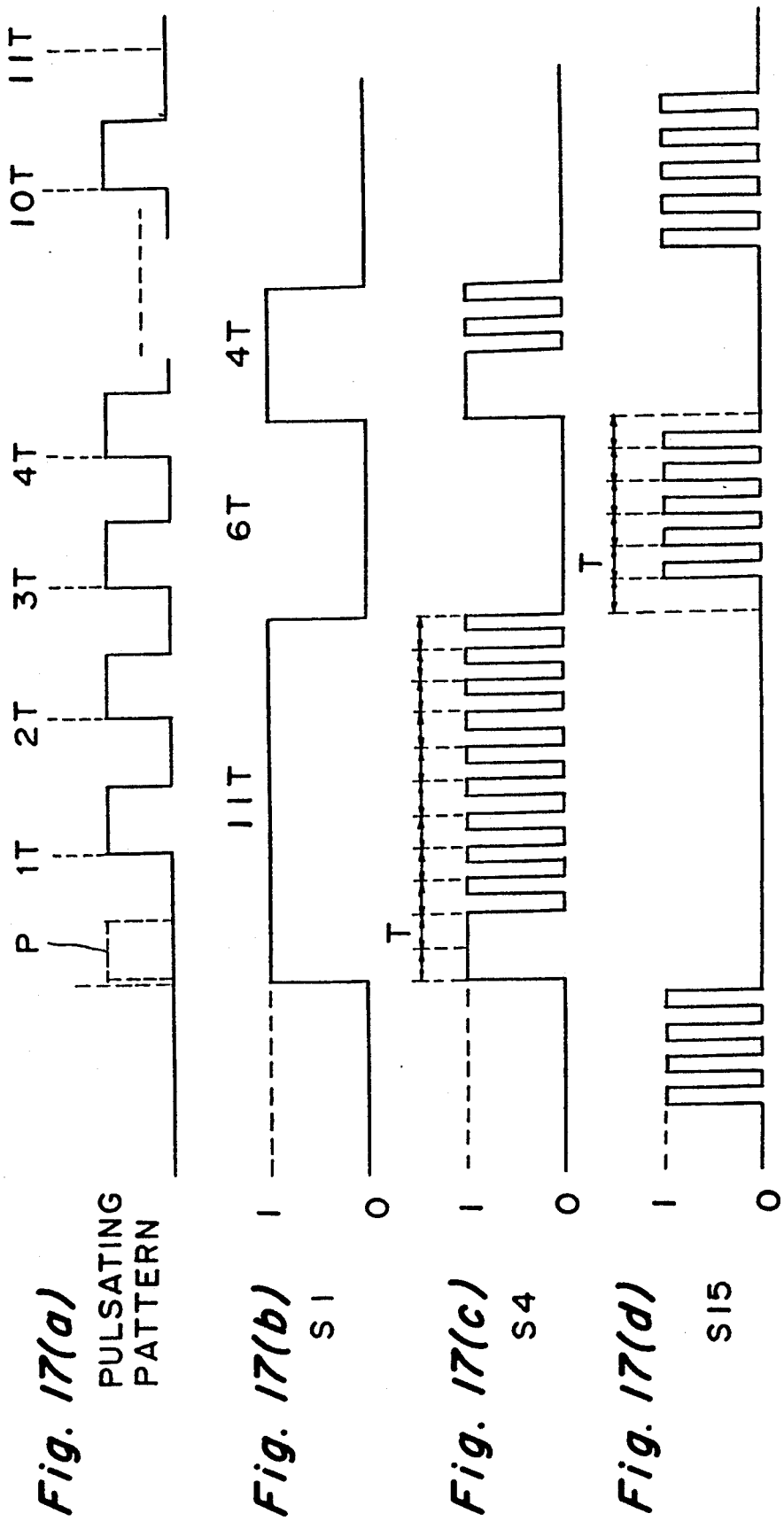
FIGS. 17(a)-17(d) show waveforms observed in the circuit of FIG. 16.

In operation, when the signal generator 1 produces the input signal s1, such as shown in FIG. 17(b), MP circuit 8 produces on line s4 the modulation pattern such as shown in FIG. 17(c), and at the same time, MP circuit 28 produces on line s15 the pulsating pattern such as shown in FIG. 17(d).

Thus, during the pulse duration period, switch 4 is alternately turned on and off in accordance with FIG. 17(c), and at the same time, switch 25 is maintained off in accordance with FIG. 17(d). Thus, during the pulse duration period, the sum of pulse current Ip, corresponding to power Pp-Pr, and continuous current Ir, corresponding to power Pr-O, as best shown in FIG. 4(b), is provided for driving the laser, thereby effecting the overwriting with the third modulated signal.

During the pulse spacing period, switch 4 is maintained off and switch 25 is alternately turned on and off in accordance with FIG. 17(d). Thus, during the pulse spacing period, the sum of pulsating current Ib, corresponding to power Pb-Pr, and continuous current Ir, corresponding to power Pr-O, is provided for driving the laser, thereby effecting the erasing.

It is to be noted that if the reference voltage setting circuit 26' is set so that Ir is not supplied when the recording gate signal Wg is input, the modulation pattern is used for making a modulated signal which varies between Pp and the power off level.

Tests are carried out to find out the effect of the third embodiment. In the tests, the basic patterns as shown in FIGS. 12(a), 12(f), and 12(m) are used. The input signal, optical disk, relative velocity of the optical disk and the recording spot, and jitter measurement method are each the same as the respective items in the first embodiment. The power level Pb used for the erase pulse string is 4.5 mW. The test results showing the values of the jitter measured in the playback signal are shown in Table 3. The jitter values as obtained are the minimum values when the recording peak power was varied. The recording peak power is also shown in Table 3 as obtained at the time of the measured jitter value.

TABLE 3

| Pattern | Jitter (nsec) | Recording peak power (mw) |
|---|---|---|
| FIG. 12 (a) | 40 | 8.4 |
| FIG. 12 (f) | 25 | 8.0 |
| FIG. 12 (m) | 20 | 8.7 |

These results show a jitter level that is less than that for each same pattern in Table 2. This is because by pulse modulation of the erase laser power, (1) the achieved temperature of the erase area becomes constant and the old recording mark is uniformly crystallized, and (2) the recording film at the end of the recording mark cools rapidly, and the edge position of the recording mark becomes clearly defined because the playback power level Pr is passed through in the transition from the recording pulse string to the erase pulse string.

It is to be noted that according to the present invention, a wave-shaped short pulse P (dotted line) is eliminated at the beginning of the pulsating pattern for the erase pulse string set, as shown in FIG. 17(a). waveform If such a short pulse P is not eliminated, the measured jitter would be undesirably increased to 30 nsec with the pattern of FIG. 12(f), because rapid cooling at the end of the recording mark may not be obtained.

Furthermore, if the pulse cycle period in the erase pulse string is the same as the pulse cycle period of the successive narrow pulses in the recording pulse string, the MP circuits 8 and 28 can be formed to have the same construction as mentioned above.

Fourth Embodiment

Figure 18:
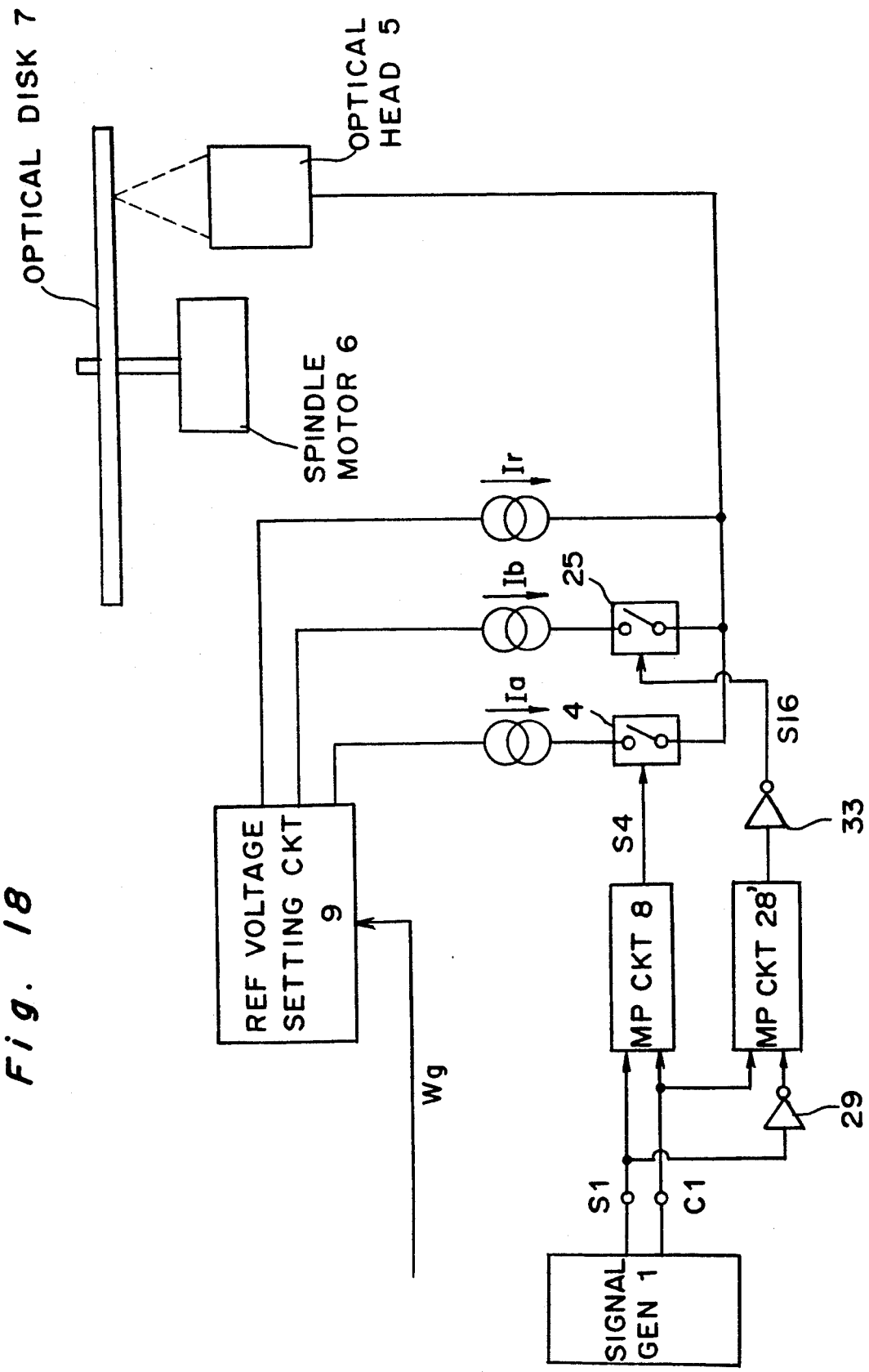
FIG. 18 is a block diagram of a recording apparatus according to a fourth embodiment of the present invention.

Referring to FIG. 18, an optical information recording apparatus for producing the fourth modulated signal (FIG. 4(c)) according to a fourth embodiment of the present invention is shown. When compared with the third embodiment, the recording apparatus of the fourth embodiment differs in the reference voltage setting circuit 9 which produces bias currents Ia (corresponding to power Pp-Pb), Ib (corresponding to power Pb-Pr) and Ir (corresponding to power Pr-O), which is the same as the first embodiment.

Furthermore, an invertor 33 is inserted between MP circuit 28' and switch 25. Also, MP circuit 28' produces the pulsating pattern such as shown in FIG. 19(a).

In operation, when the signal generator 1 produces the input signal s1, such as shown in FIG. 19(b), MP circuit 8 produces on line s4 the modulation pattern such as shown in FIG. 17(c), and at the same time, MP circuit 28' produces on line s16 the pulsating pattern such as shown in FIG. 19(c).

Thus, during the pulse duration period, switch 4 is alternately turned on and off in accordance with FIG. 17(c), and at the same time, switch 25 is maintained not off but on in accordance with FIG. 19 (d). Thus, during the pulse duration period, the sum of pulse current Ia, corresponding to power Pp-Pb, continuous current Ib, corresponding to power Pb-Pr, and continuous current Ir, corresponding to power Pr-O, as best shown in FIG. 4(c), is provided for driving the laser, thereby effecting the overwriting with the fourth modulated signal.

During the pulse spacing period, switch 4 is maintained off and switch 25 is alternately turned on and off in accordance with FIG. 17(d). Thus, during the pulse spacing period, the sum of pulsating current Ib, corresponding to power Pb-Pr, and continuous current Ir, corresponding to power Pr-O, is provided for driving the laser, thereby effecting the erasing.

It is to be noted that if the reference voltage setting circuit 9 is set so that Ir is not supplied when the recording gate signal Wg is input, the modulation pattern is used for making a modulated signal which varies between Pp and the power off level.

Tests are carried out to find out the effect of the fourth embodiment. In the tests, the basic patterns as shown in FIGS. 12(a), 12(f), and 12(m) are used. The input signal, optical disk, relative velocity of the optical disk and the recording spot, and jitter measurement method are each the same as the respective items in the first embodiment. The power level Pb used for the erase pulse string is 4.5 mW. The test results showing the values of the jitter measured in the playback signal are shown in Table 4. The jitter values as obtained are the minimum values when the recording peak power was varied. The recording peak power is also shown in Table 4 as obtained at the time of the measured jitter value.

TABLE 4

| Pattern | Jitter (nsec) | Recording peak power (mw) |
|---|---|---|
| FIG. 12 (a) | 40 | 7.2 |
| FIG. 12 (f) | 30 | 6.9 |
| FIG. 12 (m) | 25 | 7.4 |

These results show that while the jitter levels are slightly greater than those shown in Table 3, the recording peak power can be reduced. This is because the bias power level Pb is present in the recording pulse string.

Fifth Embodiment

Figure 20:
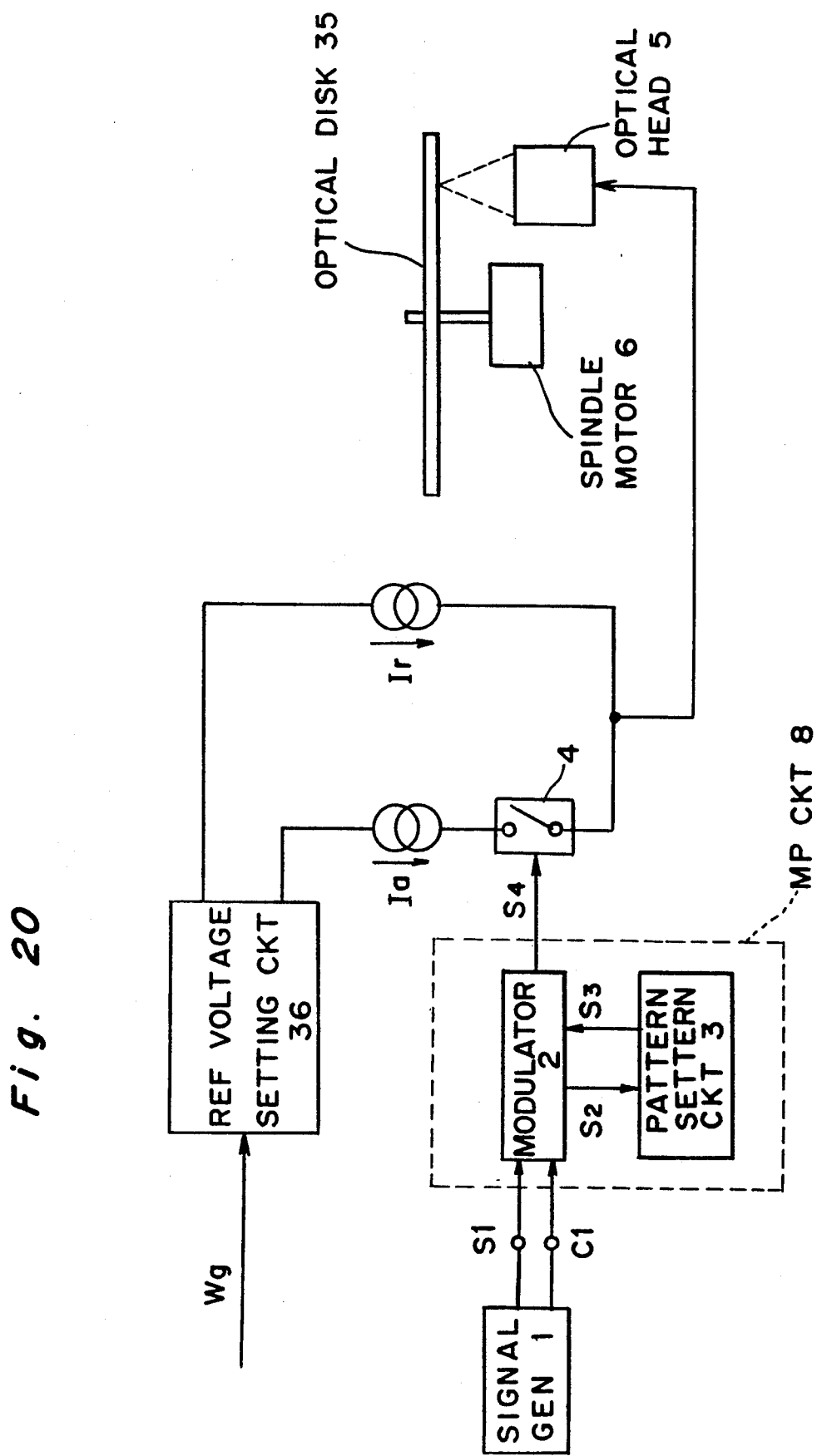
FIG. 20 is a block diagram of a recording apparatus according to a fifth embodiment of the present invention.

Referring to FIG. 20, an optical information recording apparatus according to a fifth embodiment of the present invention is shown. When compared with the first embodiment shown in FIG. 6, the recording apparatus of the fifth embodiment differs in the reference voltage setting circuit 36 which produces only bias currents Ia (corresponding to power Pp-Pb) and Ir (corresponding to power Pr-O). The bias current Ib (corresponding to power Pb-Pr) is not produced in this embodiment, because the recording apparatus according to this embodiment is particularly designed for write-once-read-many (WORM) media, as explained below.

The erase power level Pb shown in the modulated waveform in FIG. 1(b) erases the old signal during an overwrite operation. However, this embodiment of the present invention is designed in accordance with the requirements of write-once-read-many (WORM) media. The distinguishing difference between this embodiment and the first embodiment shown in FIG. 6 is the elimination of the means for generating a current Ib, which is unnecessary in write-once-read-many optical information recording apparatus wherein signal erasure is not required.

In operation, during the pulse duration period, the input signal such as shown in FIG. 21(a), is converted to basic signal by MP circuit 8. The basic signal is used for switching the switch 4 inserted in a line for the current Ia. The modulated signal such as shown FIG. 21, waveform (b) is obtained by superimposing current Ia on current Ir, and is used for drive the semiconductor laser built in to the optical head 5. The laser beam is thus modulated between the peak power level Pp and the playback power level Pr as shown in FIG. 21(b), and emitted to the WORM disk 35. By using the modulation pattern, i.e., the full or portion from the beginning of the basic pattern, the recording mark can also be reduced when writing to WORM media by means of a recording apparatus of simple construction.

During the pulse spacing period, switch 4 is maintained off so that only the continuous current Ir, corresponding to power Pr-O, is provided for driving the laser, thereby effecting no erasing.

Figure 22:
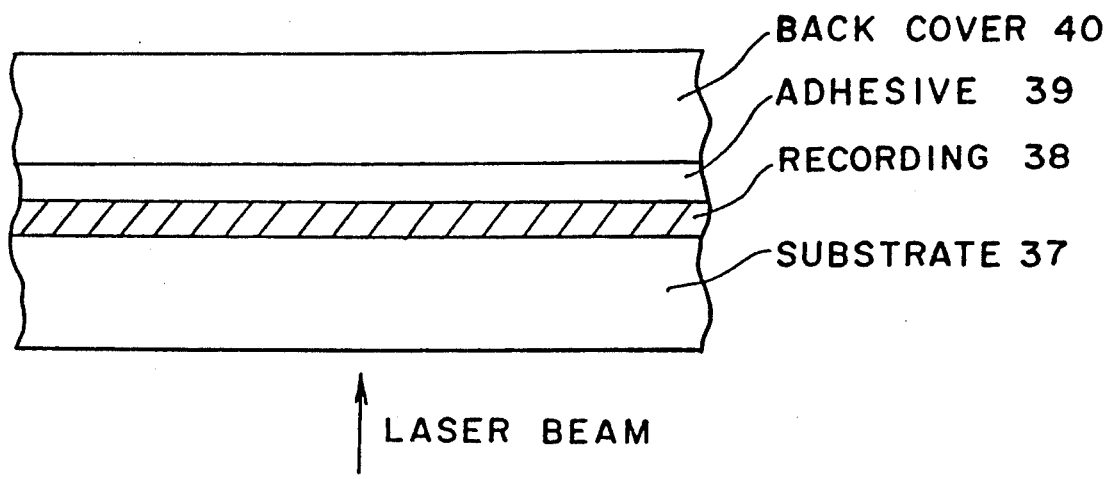
FIG. 22 is a cross-sectional view of an optical disk upon which a signal is recorded.
Figure 23A:
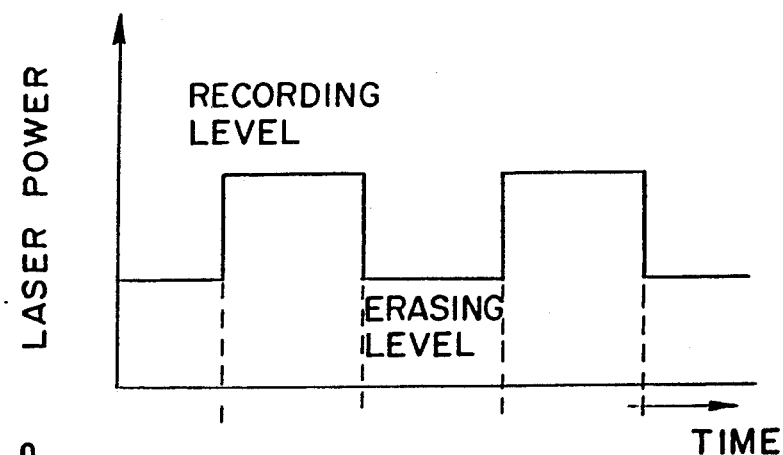
Figure 23B:
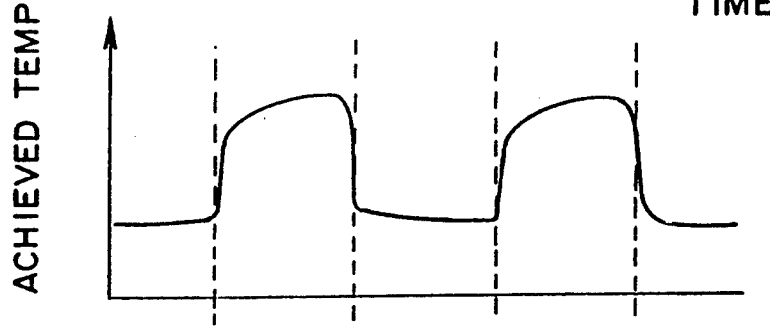
Figure 23C:
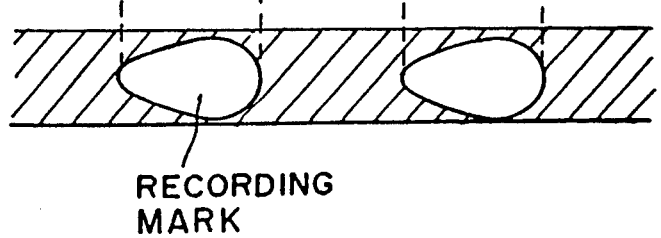

Tests are carried out to find out the effect of the fifth embodiment. In the tests, the recording medium such as shown in FIG. 22 is used, which comprises an optical disk substrate 37 made of 5" polycarbonate and on to which the signal recording track is preformed. The recording film 38 is a TePdO material with a film thickness of 1000 angstroms. A back cover 40 to protect the recording film is applied by means of an adhesive 39. When nothing is written to this disk, i.e., the disk is blank, the recording film is in an amorphous state, and signals can be recorded by emitting a laser beam to this medium to effect a phase-change conversion from this amorphous state to a crystalline state. It is not possible to erase the signals once written to this media because it is not possible to change the recording film from a crystalline to an amorphous state.

In the signal recording test, the recording apparatus shown in FIG. 20 is used. The relative speed of the optical disk and the recording spot is 1.25 m/sec. Furthermore, the basic patterns as shown in FIGS. 12(a), 12(f), 12(l) and 12(m) are used. The playback power level Pr is set to 0.7 mW by tuning the reference voltage setting circuit 36. The values of the jitter measured in the playback signal resulting from the signal recorded according to each pattern are shown in Table 5. The test results showing the values of the jitter measured in the playback signal are shown in Table 5. The jitter values as obtained are the minimum values when the recording peak power was varied. The recording peak power is also shown in Table 5 as obtained at the time of the measured jitter value.

TABLE 5

| Pattern | Jitter (nsec) | Recording peak power (mw) |
| --- | --- | --- |
| FIG. 12 (a) | 45 | 6.1 |
| FIG. 12 (f) | 35 | 6.0 |
| FIG. 12 (l) | 130 | 5.0 |
| FIG. 12 (m) | 35 | 6.3 |

As apparent from Table 5, jitter is reduced to (1) is equivalent to a case in which the recording signal S1 is used to directly modulate the laser beam, and shows a high jitter level. This example is provided for comparison with the present invention. In other words, the recording apparatus according to the present invention as shown in FIG. 20 features a simple construction, and is able to produce a recording mark with low shape distortion in write-once-read-many optical disk media.

As described hereinabove, a recording method and a recording apparatus for optical information according to the present invention are able to significantly reduce recording mark distortion and thereby reduce jitter in the playback signal to a low level by recording a new signal while erasing an old signal in a data overwrite operation by means of a device of extremely simple construction.

In addition, a recording apparatus for optical information according to the present invention is also able to record a signal with very low jitter to a write-once-read-many optical information medium by means of a device of extremely simple construction.

These achievements are directly related to a reduction in the error rate of the optical disk, and therefore to an increase in the storage capacity of the optical disk.

What is claimed is:

1. A recording apparatus which records an input signal having variable width pulse duration periods and variable width pulse spacing periods on a recording medium by irradiation of an optical beam to form recording marks corresponding to each of said pulse duration periods, said apparatus comprising:

a means for detecting a leading edge of each of said pulse duration periods and for producing a start signal thereupon;

a means for detecting a trailing edge of each of said pulse duration period and for producing a stop signal thereupon;

a means for storing a predetermined basic pattern formed by a pulse string, said pulse string having a predetermined length equal to the longest pulse duration period of said variable width pulse duration periods;

a means for producing said basic pattern from its beginning in response to said start signal and for terminating the production of said basic pattern in response to said stop signal to produce a cutout basic pattern signal;

a reference voltage setting means for producing a first bias current corresponding to a difference between recording and erasing power levels, a second bias current corresponding to a difference between erasing and playback power levels and a third bias current corresponding to said playback power level;

a first switch means disposed in a line for outputting said first bias current, said first switch means being turned on and off in accordance with said cutout basic pattern signal to produce a modulated first bias current;

a means for adding said modulated first bias current, said second bias current and said third bias current to produce a modulated signal; and a beam emitting means for emitting said optical beam in accordance with said modulated signal.

2. A recording apparatus which records an input signal having variable width pulse duration periods and variable width pulse spacing periods on a recording medium by irradiation of an optical beam to form recording marks corresponding to each of said pulse duration periods, said apparatus comprising:

a means for detecting a leading edge of each of said pulse duration periods and for producing a start signal thereupon;

a means for detecting a trailing edge of each of said pulse duration periods and for producing a stop signal thereupon;

a means for storing a predetermined basic pattern formed by a pulse string, said pulse string having a predetermined length equal to the longest pulse duration period of said variable width pulse duration periods;

a means for producing said basic pattern from its beginning in response to said start signal and for terminating the production of said basic pattern in response to said stop signal to produce a cutout basic pattern signal;

a means for generating a predetermined pulsating pattern;

a means for producing said pulsating pattern in response to said stop signal and for terminating the production of said pulsating pattern n response to said start signal to produce a cutout pulsating pattern signal;

a reference voltage setting means for producing a first bias current corresponding to a difference between recording and playback power levels, a second bias current corresponding to a difference between erasing and playback power levels and a third bias current corresponding to said playback power level;

a first switch means disposed in a line for outputting said first bias current, said first switch means being turned on and off in accordance with said cutout basic pattern signal to produce a modulated first bias current;

a second switch means disposed in a line for outputting said second bias current, said second switch means being turned on and off in accordance with said cutout pulsating pattern signal to produce a modulated second bias current;

a means for adding said modulated first bias current, said modulated second bias current and said third bias current to produce a modulated signal; and a beam emitting means for emitting said optical beam in accordance with said modulated signal.

3. A recording apparatus which records an input signal having variable width pulse duration periods and variable width pulse spacing periods on a recording medium by irradiation of an optical beam to form recording marks corresponding to each of said pulse duration periods, said apparatus comprising:

- a means for detecting a leading edge of each of said pulse duration periods and for producing a start signal thereupon;
- a means for detecting a trailing edge of each of said pulse duration periods and for producing a stop signal thereupon;
- a means for storing a predetermined basic pattern formed by a pulse string, said pulse string having a predetermined length equal to the longest pulse duration period of said variable width pulse duration periods;
- a means for producing said basic pattern from its beginning in response to said start signal and for terminating the production of said basic pattern in response to said stop signal to produce a cutout basic pattern signal;
- a reference voltage setting means for producing a first bias current corresponding to a difference between recording and playback power levels, a second bias current corresponding to a difference between erasing and playback power levels and a third bias current corresponding to said playback power level;
- a first switch means disposed in a line for outputting said first bias current, said first switch means being turned on and off in accordance with said cutout basic pattern signal to produce a modulated first bias current;
- a second switch means disposed in a line for outputting said second bias current, said second switch means being turned on during said pulse spacing periods and turned off during said pulse duration periods to produce a modulated second bias current;
- a means for adding said modulated first bias current, said modulated second bias current and said third bias current to produce a modulated signal; and
- a beam emitting means for emitting said optical beam in accordance with said modulated signal.

4. A recording apparatus as claimed in claim 1, wherein said predetermined basic pattern has such a feature that:

(I) the pulse width of at least one of the first and second pulses of said basic pattern is made greater than the pulse width of each pulse in successive pulses succeeding thereto and made constant irrespective of the length of the recording mark;

(II) the pulse width in said successive pulses is maintained constant, and (III) the pulse cycle period in said successive pulses is maintained constant.

5. A recording apparatus as claimed in claim 1, wherein said basic pattern generating means comprises an array of switches.

6. A recording apparatus as claimed in claim 1, wherein said basic pattern generating means comprises a semiconductor memory device.

7. A recording apparatus as claimed in claim 2, wherein said basic pattern producing means and said pulsating pattern producing means are operated in a synchronized manner using common clock pulses.

8. A recording apparatus as claimed in claim 1, further comprising a means for applying a predetermined power level during said pulse spacing period of said input signal.

* * * * *